US012047652B2

(12) United States Patent
Cao et al.

(10) Patent No.: US 12,047,652 B2
(45) Date of Patent: Jul. 23, 2024

(54) INFORMATION PROCESSING METHOD, APPARATUS, AND COMPUTER STORAGE MEDIUM FOR REAL-TIME VIDEO APPLICATIONS

(71) Applicant: Alibaba Group Holding Limited, Grand Cayman (KY)

(72) Inventors: Yating Cao, Hangzhou (CN); Yan Sun, Hangzhou (CN); Yue Ma, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 30 days.

(21) Appl. No.: 17/590,709

(22) Filed: Feb. 1, 2022

(65) Prior Publication Data

US 2022/0256247 A1 Aug. 11, 2022

(30) Foreign Application Priority Data

Feb. 8, 2021 (CN) .......................... 2021101725037

(51) Int. Cl.
*H04N 21/478* (2011.01)
*G06N 20/00* (2019.01)
(Continued)

(52) U.S. Cl.
CPC ....... *H04N 21/47815* (2013.01); *G06N 20/00* (2019.01); *H04N 21/2187* (2013.01); *H04N 21/4394* (2013.01); *H04N 21/4725* (2013.01)

(58) Field of Classification Search
CPC ......... H04N 21/47815; H04N 21/2187; H04N 21/4394; H04N 21/4725; H04N 21/44008;
(Continued)

(56) References Cited

U.S. PATENT DOCUMENTS 9,318,108 B2   4/2016 Gruber et al.
10,523,979 B2  12/2019 Dharmaji
(Continued)

FOREIGN PATENT DOCUMENTS

CN   104156390 A   11/2014
CN   110287402 A    9/2019

*Primary Examiner* — Kunal Langhnoja
(74) *Attorney, Agent, or Firm* — Lee & Hayes, P.C.

(57) ABSTRACT

A method including acquiring to-be-processed information corresponding to a real-time video application, the to-be-processed information comprising at least one of the following: customer identity information and real-time video identification information; identifying a target object and an information intent corresponding to the to-be-processed information; determining, according to the target object and the information intent, at least one response corresponding to the to-be-processed information; and sending the at least one response to a send terminal corresponding to the customer identity information. The target object and the information intent are acquired from the to-be-processed information, at least one response is determined according to the target object and the information intent, the response is sent to the send terminal, inquiries related to live streaming sessions are effectively handled, and a client can quickly receive responses to the inquiries, thereby effectively reducing the waiting time for the inquiries and enhancing the user experiences.

20 Claims, 18 Drawing Sheets

(51) Int. Cl.
  *H04N 21/2187*    (2011.01)
  *H04N 21/439*     (2011.01)
  *H04N 21/4725*    (2011.01)

(58) Field of Classification Search
  CPC ............... H04N 21/6582; G06N 20/00; G06Q 30/0641; G06Q 30/062; G06F 16/3329; G06F 16/35
  See application file for complete search history.

(56) References Cited

U.S. PATENT DOCUMENTS

| | | |
|---|---|---|
| 10,528,623 B2 | 1/2020 | Marlow et al. |
| 10,721,499 B2 | 7/2020 | Chang et al. |
| 11,151,889 B2 | 10/2021 | Fieldman |
| 2018/0152764 A1* | 5/2018 | Taylor ................ G06Q 30/0623 |
| 2019/0174165 A1 | 6/2019 | Pizzurro et al. |
| 2019/0247748 A1 | 8/2019 | Yusupov et al. |
| 2020/0092609 A1* | 3/2020 | Schinkel ............ H04N 21/6405 |
| 2021/0160547 A1* | 5/2021 | Baughman ............ H04N 23/60 |

* cited by examiner

INFORMATION PROCESSING METHOD, APPARATUS, AND COMPUTER STORAGE MEDIUM FOR REAL-TIME VIDEO APPLICATIONS

CROSS REFERENCE TO RELATED APPLICATIONS

This application claims priority to Chinese Patent Application No. 202110172503.7, filed on 8 Feb. 2021 and entitled "INFORMATION PROCESSING METHOD, APPARATUS, AND COMPUTER STORAGE MEDIUM FOR REAL-TIME VIDEO APPLICATIONS," which is incorporated herein by reference in its entirety.

TECHNICAL FIELD

The present disclosure relates to the technical field of information processing, and particularly relates to an information processing method, an apparatus, and a computer storage medium for a real-time video application.

BACKGROUND

Live streaming is a popular shopping channel nowadays and has been developed rapidly in recent years. Live streaming hosts guide product purchasing by means of presenting the products, answering questions, and the like. By watching the hosts introducing the products and interacting with the hosts, users may understand the products in a more intuitive manner. However, in a live streaming session with a large number of viewers, a host usually may not be able to answer all the users' questions in a timely manner, which leads to unsatisfactory user experiences.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide an information processing method, an apparatus, and a computer storage medium for a real-time video application, aiming to address the existing problems in the conventional techniques in which hosts of live streaming sessions with a large number of viewers are often unable to answer the questions from all the users in a timely manner, resulting in unsatisfactory user experiences.

An exemplary embodiment of the present disclosure provides an information processing method for a real-time video application, comprising:
  acquiring to-be-processed information corresponding to a real-time video application, the to-be-processed information comprising at least one of the following: customer identity information and real-time video identification information;
  identifying a target object and an information intent corresponding to the to-be-processed information;
  determining, according to the target object and the information intent, at least one response corresponding to the to-be-processed information; and
  sending the at least one response to a send terminal corresponding to the customer identity information.

An exemplary embodiment of the present disclosure provides an information processing apparatus for a live streaming application platform, the apparatus comprising:
  a first acquisition module, configured to acquire to-be-processed information corresponding to a real-time video application, the to-be-processed information comprising at least one of the following: customer identity information and real-time video identification information;
  a first identification module, configured to identify a target object and an information intent corresponding to the to-be-processed information;
  a first determination module, configured to determine, according to the target object and the information intent, at least one response corresponding to the to-be-processed information; and
  a first processing module, configured to send the at least one response to a send terminal corresponding to the customer identity information.

An exemplary embodiment of the present disclosure provides an electronic device, comprising a memory and a processor, wherein the memory is configured to store one or more computer instructions, which when executed by the processor, implement the above information processing method for a real-time video application.

An exemplary embodiment of the present disclosure provides a computer storage medium, configured to store a computer program, which when executed by a computer, causes the computer to implement the above information processing method for a real-time video application.

An exemplary embodiment of the present disclosure provides an information processing method for interactive information during live streaming, the method comprising:
  receiving to-be-processed information through an interactive interface of a live streaming application, the to-be-processed information comprising a target object and an information intent;
  sending the to-be-processed information to a remote service platform corresponding to the live streaming application;
  acquiring at least one response corresponding to the to-be-processed information, wherein the at least one response is related to the target object and the information intent included in the to-be-processed information; and
  displaying the at least one response in a preset region of the interactive interface of the live streaming application.

An exemplary embodiment of the present disclosure provides an information processing apparatus for interactive information during live streaming, the apparatus comprising:
  a second receiving module, configured to receive to-be-processed information through an interactive interface of a live streaming application, the to-be-processed information comprising a target object and an information intent;
  a second sending module, configured to send the to-be-processed information to a remote service platform corresponding to the live streaming application;
  a second acquisition module, configured to acquire at least one response corresponding to the to-be-processed information, wherein the at least one response is related to the target object and the information intent comprised in the to-be-processed information; and a second processing module, configured to display the at least one response in a preset region of the interactive interface of the live streaming application.

An exemplary embodiment of the present disclosure provides an electronic device, comprising: a memory and a processor, wherein the memory is configured to store one or more computer instructions, which when executed by the processor, implement the above information processing method for interactive information during live streaming.

An exemplary embodiment of the present disclosure provides a computer storage medium, configured to store a computer program, which when executed by a computer, causes the computer to implement the information processing method for the above interactive information during live streaming.

Through the information processing method for a real-time video application, the device, and the computer storage medium provided by the embodiments of the present disclosure, the to-be-processed information corresponding to the real-time video application is acquired, the target object and the information intent corresponding to the to-be-processed information are identified, then the at least one response corresponding to the to-be-processed information is determined according to the target object and the information intent, and the at least one response is sent to the send terminal corresponding to the customer identity information, thereby effectively and quickly responding to the send terminal a response to an inquiry made by a user about the target object during a live streaming session. In this way, users' waiting time for inquiries is effectively reduced, user experience is enhanced, and users may be further guided to visit an online store through the response displayed at the send terminal, thereby assisting users in making purchase decisions, and further improving the practical value of the method.

BRIEF DESCRIPTION OF DRAWINGS

To describe the technical solutions in the embodiments of the present disclosure more clearly, the following briefly describes the accompanying drawings needed for describing the embodiments or the conventional techniques. Apparently, the accompanying drawings in the following description show some instead of all embodiments of the present disclosure, and those of ordinary skill in the art may further derive other embodiments from these accompanying drawings without creative efforts.

DESCRIPTION OF EMBODIMENTS

Figure 1:
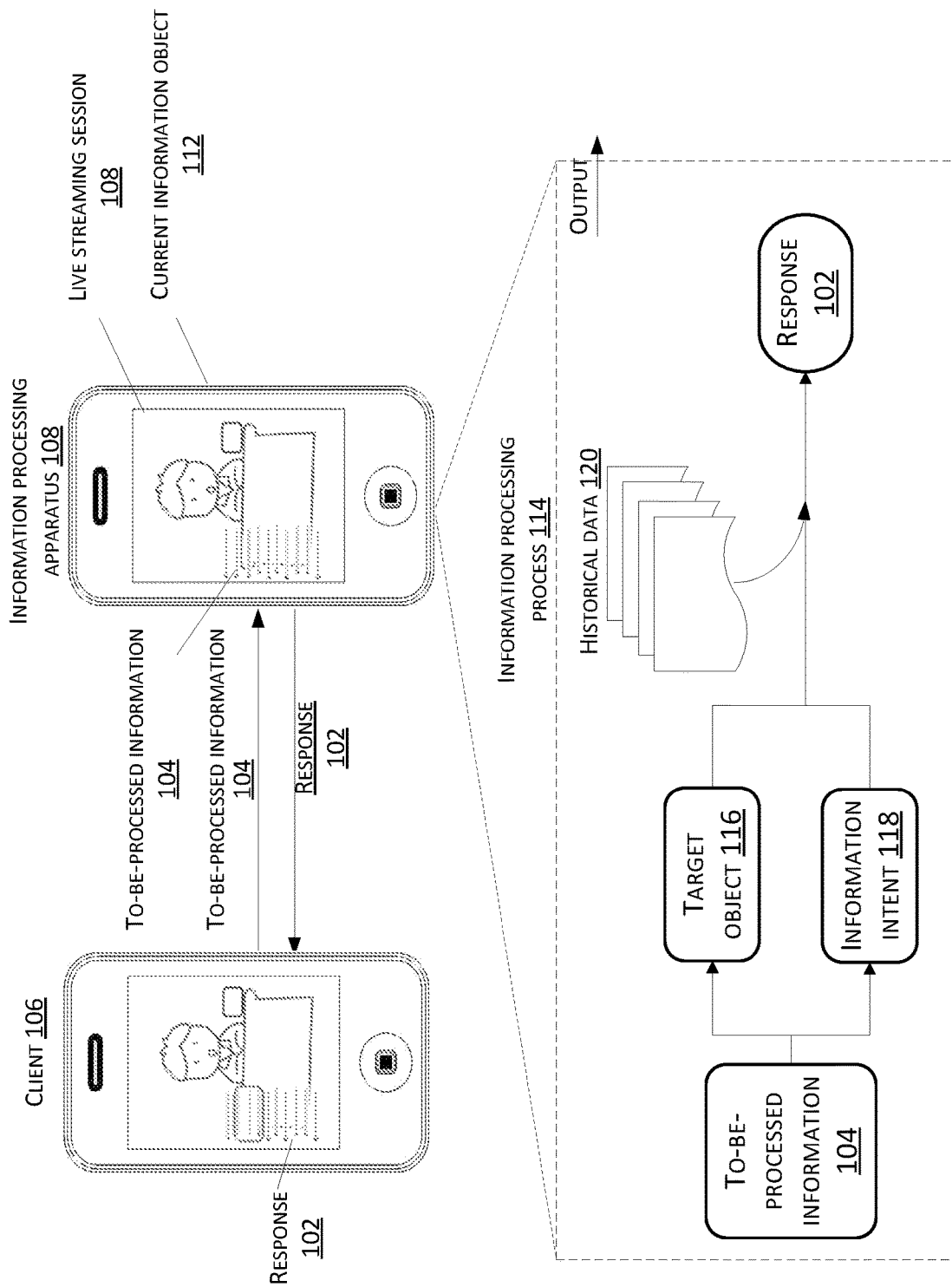
FIG. 1 is a schematic application scenario diagram of an information processing method for a real-time video application provided according to an embodiment of the present disclosure.

In order to make the objectives, technical solutions, and advantages of the embodiments of the present disclosure clearer, the technical solutions in the embodiments of the present disclosure will be described clearly and completely hereinafter in conjunction with the accompanying drawings in the embodiments of the present disclosure. Apparently, the described embodiments are a part of, rather than all, embodiments of the present disclosure. Other embodiments obtained by those of ordinary skill in the art on the basis of the embodiments of the present disclosure without creative efforts all fall within the protection scope of the present disclosure.

Terms used in the embodiments of the present disclosure are for the purpose of describing specific embodiments only and are not intended to limit the present disclosure. The singular forms "a," "the," and "said" used in the embodiments and appended claims of the present disclosure are also intended to represent plural forms thereof. Unless otherwise clearly noted in the context, "a plurality of" generally includes at least two, but including at least one should not be excluded.

It should be appreciated that the term "and/or" used herein is merely an association relationship describing associated objects, indicating that there may be three relations. For example, A and/or B may indicate the following three cases: A exists individually, A and B exist simultaneously, and B exists individually. In addition, the character "/" herein generally indicates that the associated objects before and after the character form an "or" relation.

Depending on the context, the term "if" as used herein may be interpreted as "when," or "in the case that," or "in response to a determination," or "in response to a detection." Similarly, depending on the context, the phrase "if determined" or "if detecting (a stated condition or event)" may be interpreted as "when determined" or "in response to a determination," or "when detecting (a stated condition or event)" or "in response to detecting (a stated condition or event)."

It should also be noted that the term "comprise," "include," or any other variant thereof is intended to encompass a non-exclusive inclusion, so that a product or system that involves a series of elements comprises not only those elements, but also other elements not explicitly listed, or elements that are inherent to such a product or system. Without more restrictions, an element defined by the phrase "comprising a . . . " does not exclude the presence of another same element in the product or system that comprises the element.

In addition, the sequence of steps in the following method embodiments is only an example and is not to impose a strict limitation.

In order to facilitate the understanding of the technical solutions of the present application, the following is a brief description of the conventional techniques.

Live streaming is a popular shopping channel nowadays and has been developed rapidly in recent years. Live streaming hosts guide product purchasing by means of presenting the products, answering the questions, etc. By watching the hosts introducing products and interacting with the hosts, users may understand the products in a more intuitive manner. However, in a live streaming session with a large number of viewers, a host usually may not be able to answer all the users' questions in a timely manner, which leads to unsatisfactory user experiences. In addition, shopping via live streaming is essentially one of e-commerce sales channels. Users in live streaming sessions not only pay attention to product introduction given by the host, but are also concerned about past review information of the live streaming products like ordinary consumers. However, the users are unable to directly obtain past review information in the live streaming sessions.

In order to solve the above technical problem, embodiments of the present disclosure provide an information processing method, an apparatus, and a computer storage medium for a real-time video application, wherein the entity executing the information processing method may be an information processing apparatus, which is communicatively connected to a client, as shown in FIG. 1. For example, the client is configured to send one or more pieces of to-be-processed information during the live streaming sessions, wherein the live streaming sessions may be supported and implemented by the information processing apparatus, and the client may be any computing device having the information transmission capability. The basic structure of the client may include at least one processor. The number of processors depends on the configuration and types of the client. The client may further include a memory, which may be volatile, such as a RAM, or non-volatile, such as a read-only memory (ROM), a flash memory, etc., or may include both types of memories. The memory typically stores therein an operating system (OS) and one or more application programs, and may also store therein program data, etc. In addition to the processing unit and memory, the client may further include some basic components, such as a NIC chip, an IO bus, a display assembly, some peripheral devices, etc. Optionally, some peripheral devices may include, for example, a keyboard, a mouse, a stylus, a printer, etc. The other peripheral devices are well known in the art and will not be elaborated herein. Optionally, the client may be a personal computer (PC) terminal, a terminal device having the information transmission capability, etc.

The information processing apparatus may refer to a device having the information processing function, and may be implemented as an electronic device, a server, and the like in specific applications. Herein, the server generally refers to a server for information scheduling using a network. In terms of physical implementations, the information processing apparatus may be any device capable of providing a computing service and responding to and processing service requests. For example, the information processing apparatus may be a conventional server, a cloud server, a cloud host, a virtual center, etc. The information processing apparatus is mainly composed of a processor, a hard disk, a memory, a system bus, etc., which is similar to the architecture of a general computer.

For example, the information processing apparatus may support start operation, stop operation, and the like of live streaming activities. During the live streaming process, the information processing apparatus may display interface information about the live streaming activity, and the interface information may include: live streaming operator, information objects included in the live streaming session, and the obtained at least one piece of to-be-processed information having an interactive operation with the live streaming session. There may be one or more live streaming operators, and the information objects included in the live streaming sessions may include an information object currently being broadcast and showcased and an information object, which has been showcased.

Upon the information processing apparatus acquiring the to-be-processed information sent by the client in the live streaming session, a target object and an information intent corresponding to the to-be-processed information may be identified. Then, at least one response corresponding to the to-be-processed information is determined according to the target object and the information intent. The at least one response is sent to the client corresponding to the to-be-processed information.

The client is configured to receive and display the at least one response corresponding to the to-be-processed information. As shown in FIG. 1, the response 102 may be displayed below the to-be-processed information 104 on the client 106, thereby achieving the one-to-one inquiry and response operation between the client 106 and the information processing apparatus 108 regarding the to-be-processed information 104 in the live streaming session 108, in which the host promotes the current information object 112 The information processing process 114 includes identifying the target object 116 and the information intent 118 corresponding to the to-be-processed information 104, obtaining historical data 120 corresponding to the target object 116, and determining the response 102 based on the target object 116, the information intent 118, and the historical data 120, which is then output.

This embodiment provides a method enabling information to be exchanged with a live streaming session. The method effectively implements the following: when a user in the live streaming session submits an inquiry related to at least one information object (product), a response to the inquiry pops up automatically at the client. The response may include review information, a direct response to the inquiry, etc. This method effectively reduces the waiting time for users' inquiries and enhances user experiences. Further, it indirectly guides users to visit an online store through the response displayed at the client. In addition, the method is capable of providing more information to the user in an intuitive manner by, for example, providing buyer-uploaded pictures, etc., which is beneficial in assisting the users in making a purchase decision. The practical value of the method is thus further improved.

In combination with the accompany drawings, the following describes various specific implementations of the information processing method, the apparatus, and the computer storage medium for live streaming sessions, and the implementation effects thereof in detail. As long as no conflicts between the embodiments are caused, the embodiments and the features in the embodiments below may be combined with one another.

Figure 2:
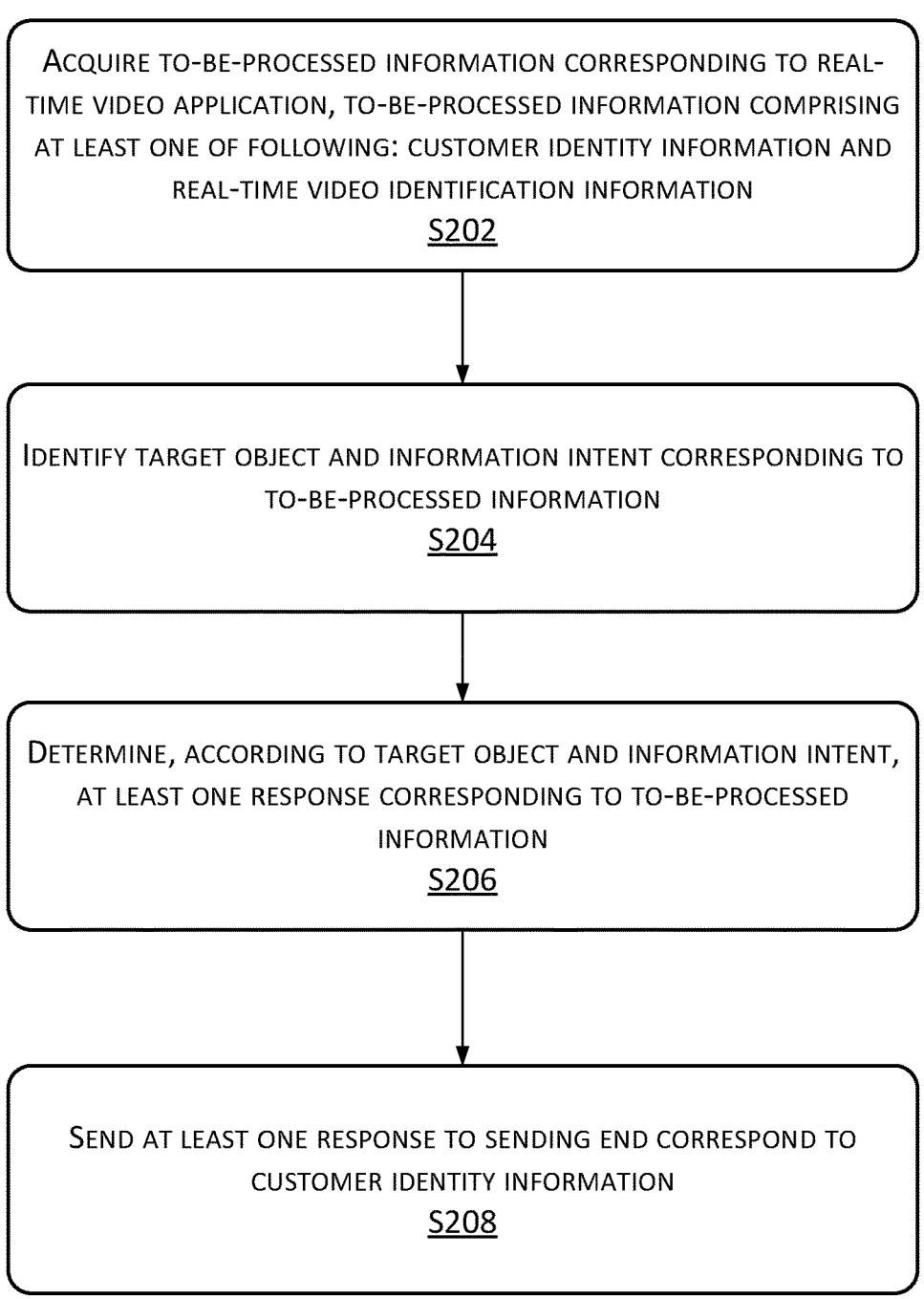
FIG. 2 is a schematic flow chart of an information processing method for a real-time video application provided according to an embodiment of the present disclosure.

FIG. 2 is a schematic flow chart of an information processing method for a real-time video application provided according to an embodiment of the present disclosure. Referring to FIG. 2, this embodiment provides an information processing method for a real-time video application, and the entity executing the method may be an information processing apparatus for a real-time video application. It should be understood that the information processing apparatus may be implemented as software or a combination of software and hardware. For example, the information processing method for a real-time video application may comprise:

step S202: acquiring to-be-processed information corresponding to a real-time video application, the to-be-processed information comprising at least one of the following: customer identity information and real-time video identification information;

step S204: identifying a target object and an information intent corresponding to the to-be-processed information;

step S206: determining, according to the target object and the information intent, at least one response corresponding to the to-be-processed information; and step S208: sending the at least one response to a send terminal corresponding to the customer identity information.

The above steps are described in detail below.

Step S202: acquiring the to-be-processed information corresponding to the real-time video application, the to-be-processed information comprising at least one of the following: the customer identity information and the real-time video identification information.

The client may refer to an electronic device connected to the information processing apparatus and having the information transmission capability. For example, if the client is capable of establishing a network connection with the information processing apparatus, the network connection may be a wireless or wired network connection. If the client and the information processing apparatus are communicatively connected, the network system of the mobile network may be any one of 2G (GSM), 2.5G (GPRS), 3G (WCDMA, TD-SCDMA, CDMA2000, UTMS), 4G (LTE), 4G+(LTE+), WiMax, 5G, etc.

The information processing apparatus and the client may be provided with a real-time video application, such that the information processing apparatus and the client are capable of implementing real-time video operations. The following takes live streaming as an example of the real-time video application to describe the implementation process of the information processing method. During the process of live streaming by the information processing apparatus, content related to the live streaming session may be displayed on a display interface. As shown in FIG. 1, the following information may be shown on the interface: a live streaming operator, an information object included in the live streaming session, and the obtained at least one piece of to-be-processed information having an interactive operation with the live streaming session. There may be one or more live streaming operators, and the information objects included in the live streaming sessions may include an information object currently being broadcast and showcased and an information object, which has been showcased. One piece of to-be-processed information may correspond to at least one information object.

During the process of live streaming, the client may send the to-be-processed information in the live streaming session. The to-be-processed information may include customer identity information configured to mark a client identity identifier and real-time video identification information. The real-time video identification information is configured to mark an identity identifier among live streaming sessions included in the same platform. That is, the same platform may be provided with multiple live streaming sessions, and a unique live streaming session corresponding to the to-be-processed information may be determined by means of the real-time video identification information.

In some examples, the to-be-processed information may be in one or more pieces. The information processing apparatus may steadily acquire the to-be-processed information corresponding to one real-time video application. In general, the to-be-processed information is related to at least one information object corresponding to the information processing apparatus.

Step S204: identifying the target object and the information intent corresponding to the to-be-processed information.

The target object may refer to an information object mentioned in the to-be-processed information. In addition, it should be understood that there may be one or more target objects. The information intent may refer to demand information corresponding to the to-be-processed information. For example, the information intent may include at least one of the following: size requirement information, quality requirement information, mailing requirement information, discount requirement information, etc. For example, the size requirement information may include at least one of the following: size information, whether the product comes in the standard size, etc. The quality requirement information may include at least one of the following: included materials, the quality assessment, etc. The mailing requirement information may include at least one of the following: the mailing manner, the mailing time, etc. The discount requirement information may include at least one of the following: discount rate information, discount time information, and the like.

Since different to-be-processed information may correspond to different information objects and information intents, after the to-be-processed information is acquired, the to-be-processed information may be analyzed and identified to determine the target object and information intent corresponding to the to-be-processed information. It should be noted that the operation of identifying the target object and the operation of identifying the information intent may be implemented as one operation or separate operations. For example, the specific manners of identifying the target object and the information intent are not limited by the embodiment, and a person skilled in the art may configure the manner according to specific application requirements and design requirements. In the case that the operation of identifying the target object and the operation of identifying the information intent are implemented as one operation, the implementation process may include: pre-training a machine learning model for identifying a data object and an information intent corresponding to the to-be-processed information; after the to-be-processed information is acquired, inputting the to-be-processed information into the machine learning model, such that the data object and the information intent corresponding to the to-be-processed information may be obtained at the same time.

In the case that the operation of identifying the target object and the operation of identifying the information intent are implemented as separate operations, the target object corresponding to the to-be-processed information may be acquired in the following manner: after the to-be-processed information is acquired, extracting keywords corresponding to the to-be-processed information, and analyzing and matching the keywords to determine the target object corresponding to the to-be-processed information. The operation of identifying the information intent corresponding to the to-be-processed information may include: analyzing and identifying, by using a machine learning model, the to-be-processed information to obtain at least one information intent corresponding to the to-be-processed information, wherein the machine learning model is trained to determine an information intent of the to-be-processed information.

Apparently, a person skilled in the art may also use other approaches to identify the target object and the information intent corresponding to the to-be-processed information, as long as the accuracy and reliability of identifying the target object and the information intent corresponding to the to-be-processed information are guaranteed. Those approaches will not be elaborated herein.

Step S206: determining, according to the target object and the information intent, the at least one response corresponding to the to-be-processed information.

The response may include at least one of the following: review keyword, transaction quantity, valid review, application status information, and an intent response. For example, the review keyword may include: service review keyword (fast reply, fast delivery, slow mailing, and the like), and quality review keyword (soft hand feel, a good size fit, and the like). The valid review may refer to authentic review information which may be acquired through a preset database and may include at least one of the following: pre-transaction data and post-transaction data. The pre-transaction data may include user inquiry information and inquiry response. The post-transaction data may include positive review information, negative review information, neutral review information, complaint information, and the like. The application status information may include any type of information: picture information, video information, and the like, an example of which may be a buyer-uploaded image and the like. The intent response may be direct response acquired, for example, for the information intent. For example, if the information intent is "whether an X-sized product can fit a user with a height of H and a weight of G," the intent response in this case may be "suitable" or "not suitable, but an XX-sized product is suitable for a user with a height of H and a weight of G," and the like.

Different target objects and/or different information intents may correspond to different responses. Thus, in order to accurately provide feedback for the to-be-processed information submitted by the client, after the target object and information intent are acquired, at least one response corresponding to the to-be-processed information is determined on the basis of the target object and the information intent, thereby providing accurate and relevant feedback for the to-be-processed information submitted by the customer.

For example, specific implementation manners of determining the at least one response corresponding to the to-be-processed information is not limited by this embodiment. A person skilled in the art may configure the manner according to specific application requirements and design requirements. For example, a first database and a second database may be pre-configured, where various information objects and at least one first response corresponding to each of the information objects are stored in the first database, and various information intents and at least one second response corresponding to each of the information intents are stored in the second database. After the target object is acquired, at least one first response corresponding to said target object may be acquired from the first database. Similarly, after the information intent is acquired, at least one second response corresponding to said information intent may be acquired from the second database. Finally, at least one response corresponding to the to-be-processed information is determined using the acquired at least one first response and at least one second response, thereby effectively guaranteeing the accuracy and reliability when the at least one response is acquired.

Apparently, a person skilled in the art may also use other approaches to determine the at least one response corresponding to the to-be-processed information according to the target object and the information intent, as long as the accuracy and reliability of determining the at least one response corresponding to the to-be-processed information are guaranteed. Those approaches will not be elaborated herein.

Step S208: sending the at least one response to the send terminal corresponding to the customer identity information.

After the at least one response is acquired, the at least one response may be sent to the send terminal corresponding to the customer identity information, so as to enable the client to learn the at least one response corresponding to the to-be-processed information in a timely manner. It should be noted that the information processing apparatus does not send the at least one response to other clients unrelated to the to-be-processed information. In other words, the other clients unrelated to the to-be-processed information will not receive the at least one response, thereby effectively achieving a one-to-one information interactive operation between the information processing apparatus and the client. This effectively avoids the situation where the display clarity is hindered due to the cluttered responses displayed on the live streaming interface. As such, the flexibility and reliability of the method during use is further enhanced.

For example, a live streaming session corresponding to the information processing apparatus has client 1, client 2, and client 3 connected thereto. When the clients have not sent any to-be-processed information for the live streaming session, the same interface information is displayed for client 1, client 2, and client 3. If client 1 sends to-be-processed information 1 and client 2 sends to-be-processed information 2, response 1 corresponding to the to-be-processed information 1 and response 2 corresponding to the to-be-processed information 2 are acquired through analysis and processing. Response 1 is then sent to client 1 and response 2 is sent to client 2. In this case, client 1 receives and displays response 1, client 2 receives and displays response 2, and client 3 will not receive response 1 or response 2. Therefore, different interface information is displayed for client 1, client 2, and client 3.

Through the information processing method for a real-time video application provided by the embodiments, the to-be-processed information corresponding to the real-time video application is acquired, the target object and the information intent corresponding to the to-be-processed information are identified, then the at least one response corresponding to the to-be-processed information is determined according to the target object and the information intent, and the at least one response is sent to the send terminal corresponding to the customer identity information, thereby effectively and quickly sending to the client a response to an inquiry made by a user about the target object during a live streaming session. In this way, users' waiting time for inquiries is effectively reduced, user experience is enhanced, and users may be further guided to visit an online store through the response displayed at the client, thereby assisting users in making purchase decisions, and further improving the practical value of the method.

Figure 3:
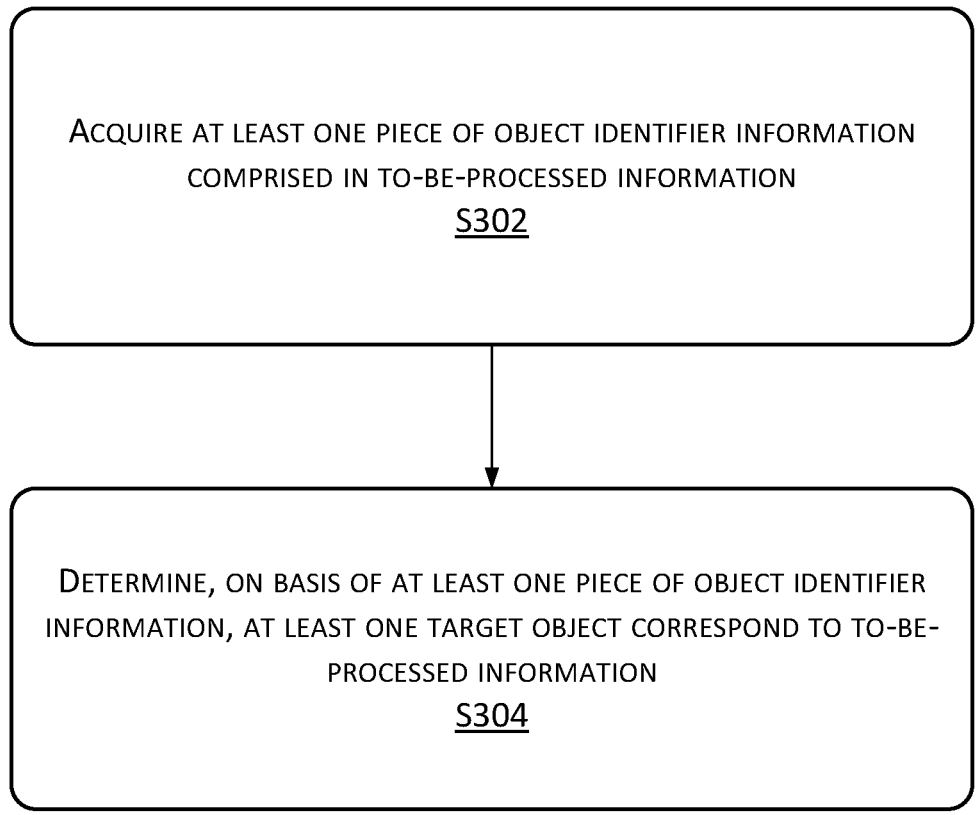
FIG. 3 is a schematic flow chart for identifying a target object corresponding to the to-be-processed information provided according to an embodiment of the present disclosure.

FIG. 3 is a schematic flow chart for identifying a target object corresponding to the to-be-processed information provided according to an embodiment of the present disclosure. On the basis of the embodiments above and still referring to FIG. 3, this embodiment provides an implementation manner of identifying a target object. For example, the identifying the target object corresponding to the to-be-processed information in this embodiment may include:

step S302: acquiring at least one piece of object identifier information comprised in the to-be-processed information; and step S304: determining, on the basis of the at least one piece of object identifier information, at least one target object corresponding to the to-be-processed information.

Different target objects may correspond to different pieces of object identifier information. Therefore, in order to accurately acquire at least one target object corresponding to the to-be-processed information, after the to-be-processed information is acquired, a keyword identification operation may be performed on the to-be-processed information, so as to acquire at least one piece of object identifier information included in the to-be-processed information. The object identifier information may include at least one of the following: object name information and object number information. After the at least one piece of object identifier information is acquired, the information object corresponding to the at least one piece of object identifier information may be determined to be the at least one target object corresponding to the to-be-processed information, thereby effectively guaranteeing the accuracy and reliability of identifying the at least one target object.

In some examples, there may be one or more target objects. In this case, the determining, on the basis of the at least one piece of object identifier information, the at least one target object corresponding to the to-be-processed information may include: identifying, on the basis of the at least one piece of object identifier information, at least one information object corresponding to the to-be-processed information; acquiring a current information object related to the currently broadcast content of the real-time video application; if the at least one information object includes the current information object, determining the current information object to be the target object corresponding to the to-be-processed information; and if the at least one information object does not include the current information object, determining the at least one information object to be the target object corresponding to the to-be-processed information.

After the at least one piece of object identifier information is acquired, at least one information object related to the currently broadcast content of the real-time video application may be determined on the basis of the at least one piece of object identifier information, and then the current information object being described in the live streaming session may be acquired. In some examples, the acquiring the current information object being described in the live streaming session may include: acquiring the current speech information currently being broadcast by the real-time video application; determining text information corresponding to the current speech information; and analyzing and identifying the text information to acquire the current information object related to the currently broadcast content of the real-time video application.

For example, the information processing apparatus is provided with a speech acquisition apparatus, which may acquire the current speech information of the live streaming session in real-time. The current speech information is converted into text information by using a preset algorithm, such that the text information corresponding to the current speech information may be acquired. Next, the text information may be analyzed and identified, and the current information object related to the currently broadcast content of the live streaming session may then be acquired.

After the current information object being described in the live streaming session is acquired, whether the at least one information object includes the current information object may be determined. If the at least one information object includes the current information object, it indicates that the user is interested in the current information object being showcased in the live streaming session. Therefore, the current information object may be determined to be the target object corresponding to the to-be-processed information. In such case, there is one target object. In this way, real-time information interactive operation between the user and the live streaming session for the target object may be effectively implemented. If the at least one information object does not include the current information object, it indicates that the information object currently being showcased in the live streaming session is not the information object appealing or of interest to the user. Therefore, the identified at least one information object may be directly determined to be the target object corresponding to the to-be-processed information. In this case, there may be one or more target objects.

By acquiring the at least one piece of object identifier information included in the to-be-processed information, and determining, on the basis of the at least one piece of the object identifier information, the at least one target object corresponding to the to-be-processed information, this embodiment effectively achieves accurate and reliable analysis and identification of the at least one target object, and further improves the quality and efficiency of analyzing and processing the to-be-processed information.

Figure 4:
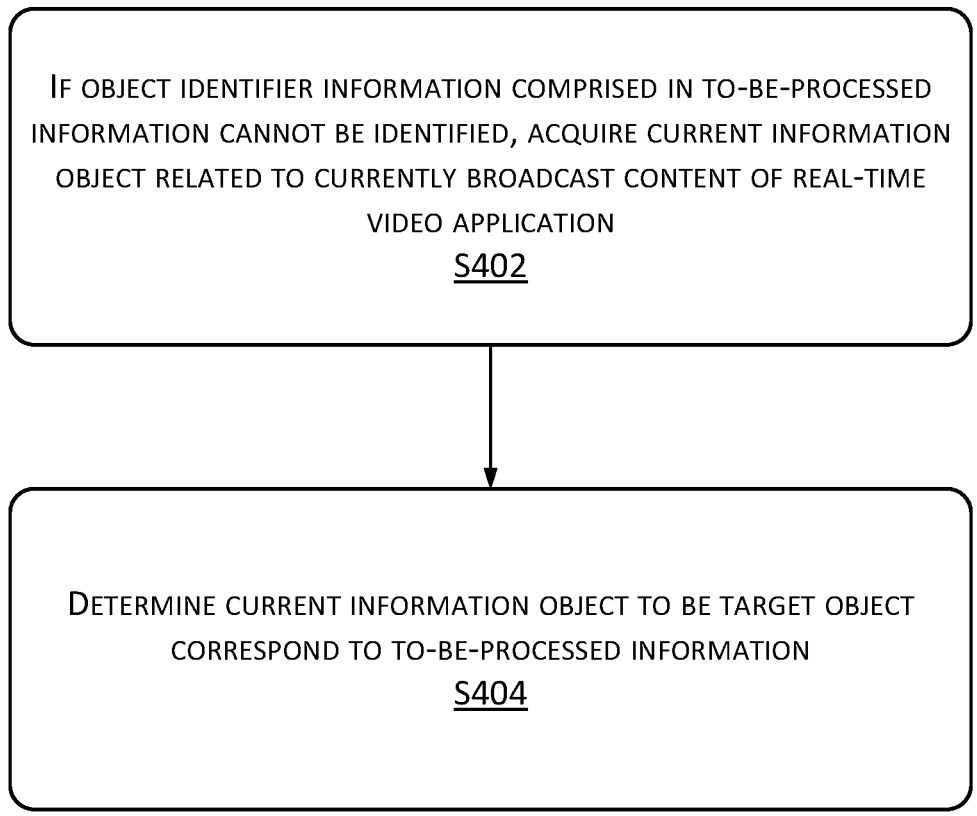
FIG. 4 is a schematic flow chart of another information processing method for a real-time video application provided according to an embodiment of the present disclosure.

FIG. 4 is a schematic flow chart of another information processing method for a real-time video application provided according to an embodiment of the present disclosure. On the basis of the embodiments above and still referring to FIG. 4, analyzing and identifying the object identifier information included in the to-be-processed information may give rise to two identification results, with one result being that the object identifier information included in the to-be-processed information is acquired, and the other being that the object identifier information included in the to-be-processed information cannot be acquired. It should be appreciated that different identification results may have different impacts on the information processing operations. Therefore, in order to ensure the quality and efficiency in analyzing and processing information, the method in this embodiment may further comprise:

step S402: if the object identifier information comprised in the to-be-processed information cannot be identified, acquiring a current information object related to the currently broadcast content of the real-time video application; and step S404: determining the current information object to be the target object corresponding to the to-be-processed information.

After the to-be-processed information is acquired, an identification operation for the object identifier information may be performed on the to-be-processed information. If the to-be-processed information does not include the object identifier information, or if an error occurs while analyzing the to-be-processed information, the object identifier information included in the to-be-processed information would not be identified. In the case that the object identifier information included in the to-be-processed information cannot be identified, in order to ensure good user experiences, the current information object related to the currently broadcast content of the real-time video application may be acquired. That is, the current information object being described in the live streaming session may be acquired, and the current information object being described in the live streaming session is determined to be the target object corresponding to the to-be-processed information, thereby effectively guaranteeing the flexibility and reliability in determining the target object, which is beneficial in ensuring good user experiences.

It should be understood that the specific implementation manner of acquiring the current information object being described in the live streaming session is the same as the specific implementation manner of acquiring the current information object in the above embodiments. Details may be obtained by referring to the content stated above and will not be further elaborated herein.

Figure 5:
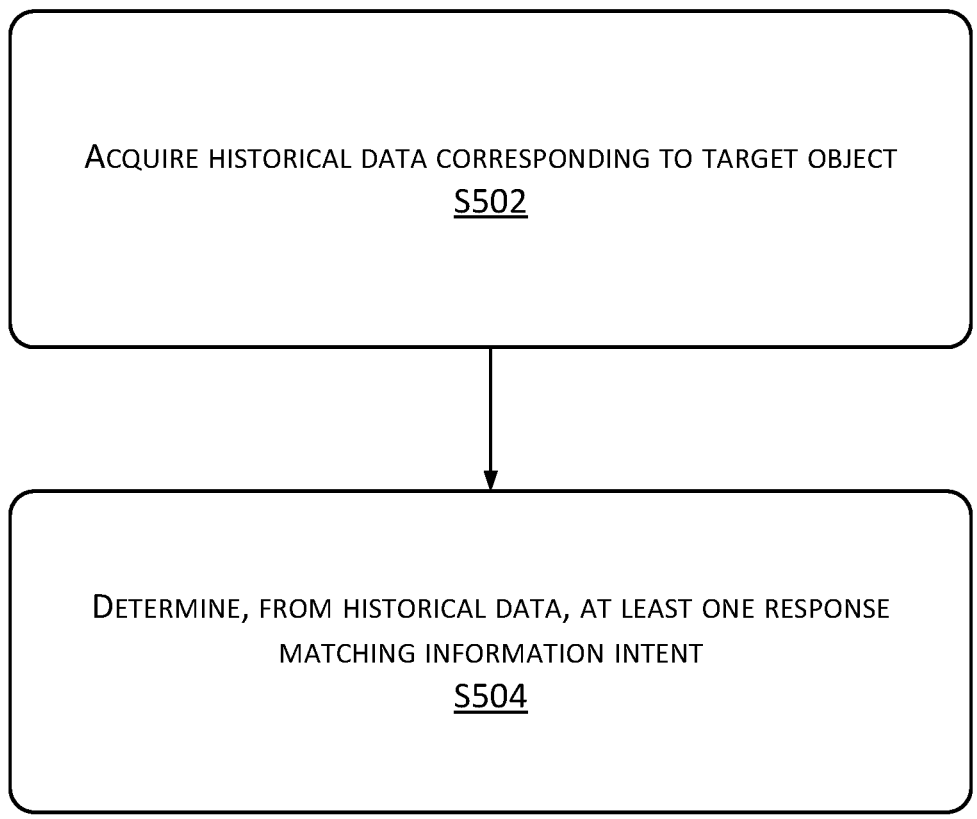
FIG. 5 is a schematic flow chart for determining at least one response corresponding to the to-be-processed information according to the target object and the information intent provided according to an embodiment of the present disclosure.

FIG. 5 is a schematic flow chart for determining at least one response corresponding to the to-be-processed information according to the target object and the information intent provided according to an embodiment of the present disclosure. On the basis of the embodiments above and still referring to FIG. 5, the specific implementation manner of determining the at least one response corresponding to the to-be-processed information is not limited by this embodiment. A person skilled in the art may perform configurations according to the specific application scenarios and application requirements. For example, the determining the at least one response corresponding to the to-be-processed information according to the target object and the information intent in this embodiment may comprise:

step S502: acquiring historical data corresponding to the target object; and step S504: determining, from the historical data, the at least one response matching the information intent.

Since different information objects may correspond to different historical data, the historical data may include at least one of the following: review keyword, transaction quantity, valid review, application status information, and intent response, and the valid review includes at least one of the following: pre-transaction data and post-transaction data. Therefore, in order to accurately determine the at least one response corresponding to the to-be-processed information, after the target object is acquired, a preset mapping relationship between an information object and historical data is used to determine the historical data corresponding to the target object. The at least one response matching the information intent is then determined from the historical data. It should be understood that the at least one response may be at least a portion of the historical data, thereby effectively achieving the accuracy and reliability in determining the at least one response.

In some other examples, the determining the at least one response corresponding to the to-be-processed information according to the target object and the information intent may comprise:

step S502': acquiring historical data corresponding to the information intent; and step S504': determining, from the historical data, the at least one response matching the target object.

Since different information intents may correspond to different historical data, in order to accurately determine the at least one response corresponding to the to-be-processed information, after the information intent is acquired, a preset mapping relationship between the information intent and historical data is used to determine the historical data corresponding to the information intent. The at least one response matching the target object is then determined from the historical data. It should be understood that the at least one response may be at least a portion of the historical data, thereby effectively achieving the accuracy and reliability in determining the at least one response.

Figure 6:
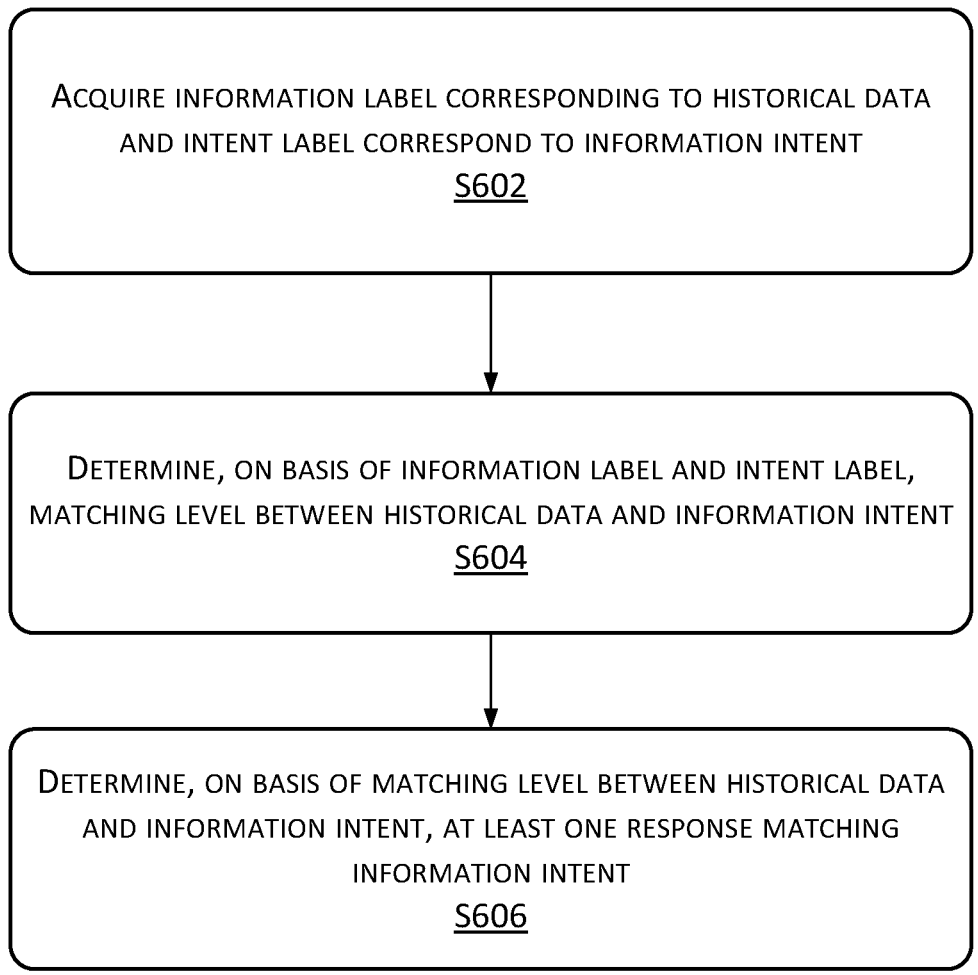
FIG. 6 is a schematic flow chart for determining, from the historical data, the at least one response matching the information intent provided according to an embodiment of the present disclosure.

FIG. 6 is a schematic flow chart for determining, from the historical data, the at least one response matching the information intent provided according to an embodiment of the present disclosure. On the basis of the embodiments above and still referring to FIG. 6, the determining, from the historical data, the at least one response matching the information intent may comprise:

step S602: acquiring an information label corresponding to the historical data and an intent label corresponding to the information intent;

step S604: determining, on the basis of the information label and the intent label, a matching level between the historical data and the information intent; and step S606: determining, on the basis of the matching level between the historical data and the information intent, the at least one response matching the information intent.

After the historical data is acquired, in order to quickly determine the at least one response matching the information intent, the information label corresponding to the historical data and the intent label corresponding to the information intent may be respectively acquired. Analysis and matching may be performed on the information label and the intent label to acquire a matching level between the information label and the intent label. The matching level between the information label and the intent label may then be determined to be the matching level between the historical data and the information intent.

After the matching level between the historical data and the information intent is acquired, the matching level between the historical data and the information intent may then be analyzed and processed to determine the at least one response matching the information intent. In some examples, the determining, on the basis of the matching level between the historical data and the information intent, the at least one response matching the information intent may comprise: sorting, in a descending order, all pieces of the historical data according to matching levels between the historical data and the information intent to obtain first sorted information of all pieces of the historical data; acquiring a first number configured to limit the number of the response; and determining the first number of leading pieces of the historical data in the first sorted information to be the at least one response matching the information intent.

It should be understood that the historical data may include a large amount of data, and matching levels between individual pieces of historical data and the information intent are different. In order to acquire the at least one response matching the information intent, after the matching levels between the historical data and the information intent are acquired, all pieces of the historical data may be arranged in a descending order according to the matching levels between the pieces of the historical data and the information intent, such that the first sorted information corresponding to all pieces of the historical data may be acquired. Then, the first number configured to limit the number of may be acquired, wherein the first number may be data stored in a preset region and preset by the user. For example, the first number may be 3, 5, 10, or the like. Therefore, the first number configured to limit the number of may be acquired by accessing the preset region. After the first number is acquired, the first number of leading pieces of the historical data in the first sorted information may be determined to be the at least one response matching the information intent. The first number of responses are the historical data which matches the target object and the information intent.

For example, historical data corresponding to a target object may include data a, data b, data c, data d, and data f. Information labels corresponding to the historical data and intent labels corresponding to the information intents may then be acquired. For example, data a corresponds to information label A; data b corresponds to information label B; data c corresponds to information label C; data d corresponds to information label D; and data f corresponds to information label F.

Then, matching levels between the information labels and intent labels may be acquired, and said matching levels are determined to be the matching levels between respective pieces of the historical data and the information intents. For example, the matching level between information label A and the intent label is P1; the matching level between information label B and the intent label is P2; the matching level between information label C and the intent label is P3; the matching level between information label D and the intent label is P4; and the matching level between information label F and the intent label is P5, wherein the magnitude relationship among said matching levels is P3>P4>P2>P1>P5. In other words, the first sorted information of all pieces of historical data is data c, data d, data b, data a, data.

If the preset first number configured to limit the number of responses is 3, the three leading pieces of the historical data in the first sorted information may be determined to be the at least one response matching the information intent. In other words, the at least one response matching the information intent may be determined to be data c, data d, data b, thereby effectively ensuring the accuracy and reliability in determining the at least one response matching the information intent, and further improving the quality and efficiency of information analysis and processing.

Through acquiring the information labels corresponding to the historical data and the intent labels corresponding to the information intents, determining the matching levels between the historical data and the information intents on the basis of the information labels and the intent labels, and determining the at least one response matching the information intents on the basis of the matching levels between the historical data and the information intents, this embodiment achieves an accurate and effective acquisition of the at least one response for the to-be-processed information without having to wait for users to respond, thereby effectively reducing the waiting time for users' inquiries, facilitating the enhancement of user experiences, and further improving the practical values of the method.

Figure 7:
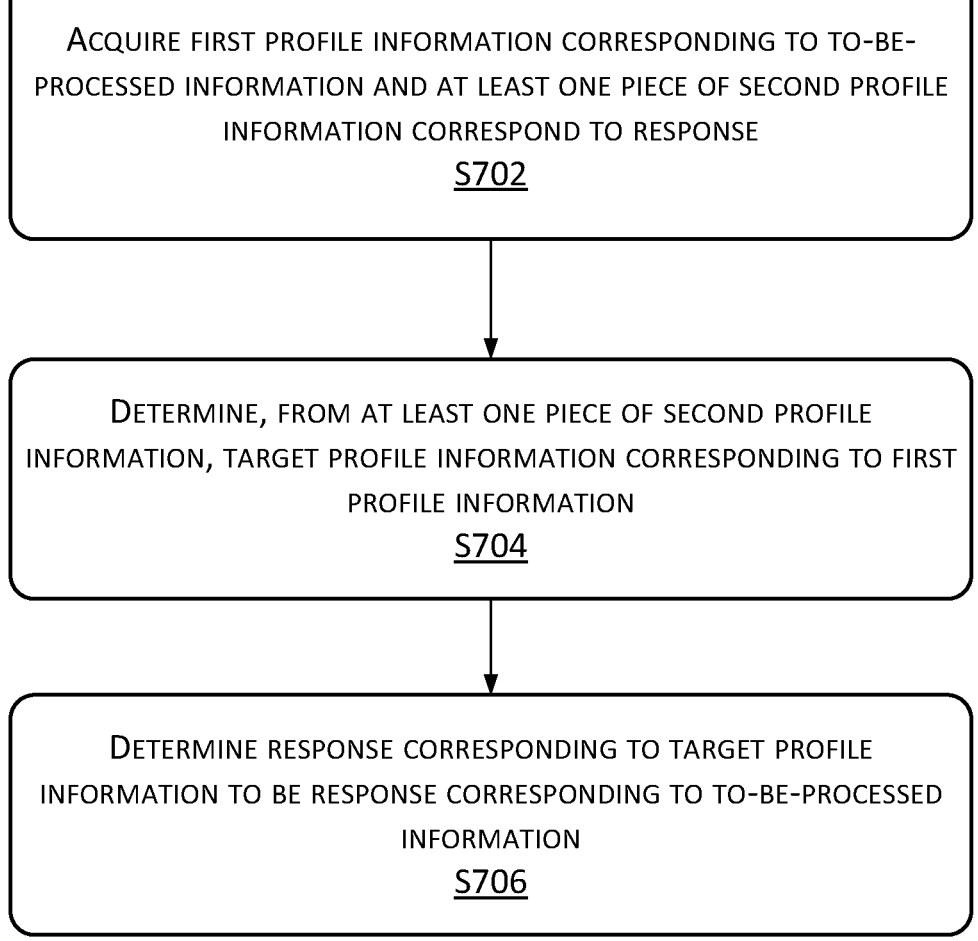
FIG. 7 is a schematic flow chart of yet another information processing method for a real-time video application provided according to an embodiment of the present disclosure.

FIG. 7 is a schematic flow chart of yet another information processing method in a live streaming session provided according to an embodiment of the present disclosure. On the basis of the embodiments above and still referring to FIG. 7, after the at least one response corresponding to the to-be-processed information is determined, the method in this embodiment may further comprise the following steps.

Step S702: acquiring first profile information corresponding to the to-be-processed information and at least one piece of second profile information corresponding to the response.

In order to further improve the accuracy and reliability in determining the response, after the at least one response is acquired, the first profile information corresponding to the to-be-processed information and at least one second user profile corresponding to the response may be acquired. It should be understood that the first profile information may correspond to a first user, and the at least one second user profile may correspond to different second users. In addition, the second users may include a second user having a high similarity to the first user and a second user having a low similarity thereto. For a second user having a low similarity, the similarity levels of preferences for corresponding to-be-processed information and responses to the to-be-processed information between the first user and said second user are low. For a second user having a high similarity level, the similarity levels of preferences for corresponding to-be-processed information and responses to the to-be-processed information between the first user and said second user are high.

Therefore, in order to further enhance the accuracy and reliability in determining the response corresponding to the to-be-processed information and to ensure good user experiences, after the to-be-processed information is acquired, the first profile information corresponding to the to-be-processed information and the at least one piece of second profile information corresponding to the response may be acquired. For example, the first profile information corresponding to the to-be-processed information and the at least one piece of second profile information corresponding to the response may be stored in a preset database. The first profile information corresponding to the to-be-processed information may be acquired by accessing the preset database. The first profile information may include: historical purchase information of a requesting user, historical review information of the requesting user, historical preference information of the requesting user, historical browsing information of the requesting user, and the like. The second profile information may include: historical purchase information of past users, historical review information of the past users, historical preference information of the past users, historical browsing information of the past users, and the like.

Step S704: determining, from the at least one piece of second profile information, target profile information corresponding to the first profile information.

After the at least one piece of second profile information is acquired, all of the second profile information and the first profile information may be analyzed and processed to determine the target profile information corresponding to the first profile information. It should be understood that the target profile information may refer to the pieces of second profile information having a high similarity level with the first profile information.

In some examples, the determining, from the at least one piece of second profile information, the target profile information corresponding to the first profile information may include: acquiring a matching level between the first profile information and each of the at least one piece of second profile information; and determining, on the basis of the matching level and from the at least one piece of second profile information, the target profile information corresponding to the first profile information.

After the first profile information and the at least one piece of second profile information are acquired, matching level analysis may be performed between the first profile information and each piece of the at least one piece of second profile information, thereby obtaining the matching levels between the first profile information and each piece of the second profile information. The target profile information corresponding to the first profile information may then be determined on the basis of the matching levels between the first profile information and each piece of the second profile information.

In some embodiments, the determining, on the basis of the matching level and from the at least one piece of second profile information, the target profile information corresponding to the first profile information may include: sorting, in a descending order, all pieces of the second profile information according to matching levels between the pieces of the second profile information and the first profile information to obtain second sorted information for all pieces of the second profile information; acquiring a second number configured to limit the number of the target profile information; and determining the second number of leading pieces of the second profile information in the second sorted information to be the at least one piece of target profile information corresponding to the first profile information.

For example, after the matching levels between the second profile information and the first profile information are acquired, all pieces of the second profile information may be sorted according to said matching levels in a descending order, thereby obtaining the corresponding second sorted information among all pieces of the profile information. The second number configured to limit the number of the target profile information is then acquired. The second number of leading pieces of the second profile information in the second sorted information are determined to be the at least one piece of target profile information corresponding to the first profile information.

For example, the at least one piece of second profile information may include profile a, profile b, profile c, profile d, and profile f. The first profile information may include profile A. The matching levels between the first profile information and the second profile information may then be acquired. For example, the matching level between profile a and profile A is P1; the matching level between profile b and profile A is P2; the matching level between profile c and profile A is P3; the matching level between profiled and profile A is P4; the matching level between profile f and profile A is P5, wherein the magnitude relationship among the above matching levels is P2>P1>P3>P4>P5. Therefore, the second sorted information corresponding to all pieces of the second profile information is acquired as follows: profile b, profile a, profile c, profile d, profile f.

If the preset second number configured to limit the number of the target profile information is 2, then the two leading pieces of the second profile information in the second sorted information may be determined to be the target profile information corresponding to the first profile information, thereby effectively ensuring the accuracy and reliability in determining the target profile information, and further improving the quality and efficiency of information analysis and processing.

Step S706: determining a response corresponding to the target profile information to be the response corresponding to the to-be-processed information.

After the target profile information is acquired, a response corresponding to the target profile information may be determined to be the response corresponding to the to-be-processed information. The response matches the target object and the information intent in the to-be-processed information. In addition, a user corresponding to the response has a high similarity level to the user corresponding to the to-be-processed information, thereby effectively improving the accuracy and reliability in determining the response.

Through acquiring the first profile information corresponding to the to-be-processed information and the at least one piece of second profile information corresponding to the response, determining the target profile information corresponding to the first profile information from the at least one piece of second profile information, and determining the response corresponding to the target profile information to be the response corresponding to the to-be-processed information, this embodiment effectively achieves the acquisition of a targeted response. In this way, the response sent to the client can accurately meet users' processing requirements, thereby further enhancing the practical value of the method.

Figure 8:
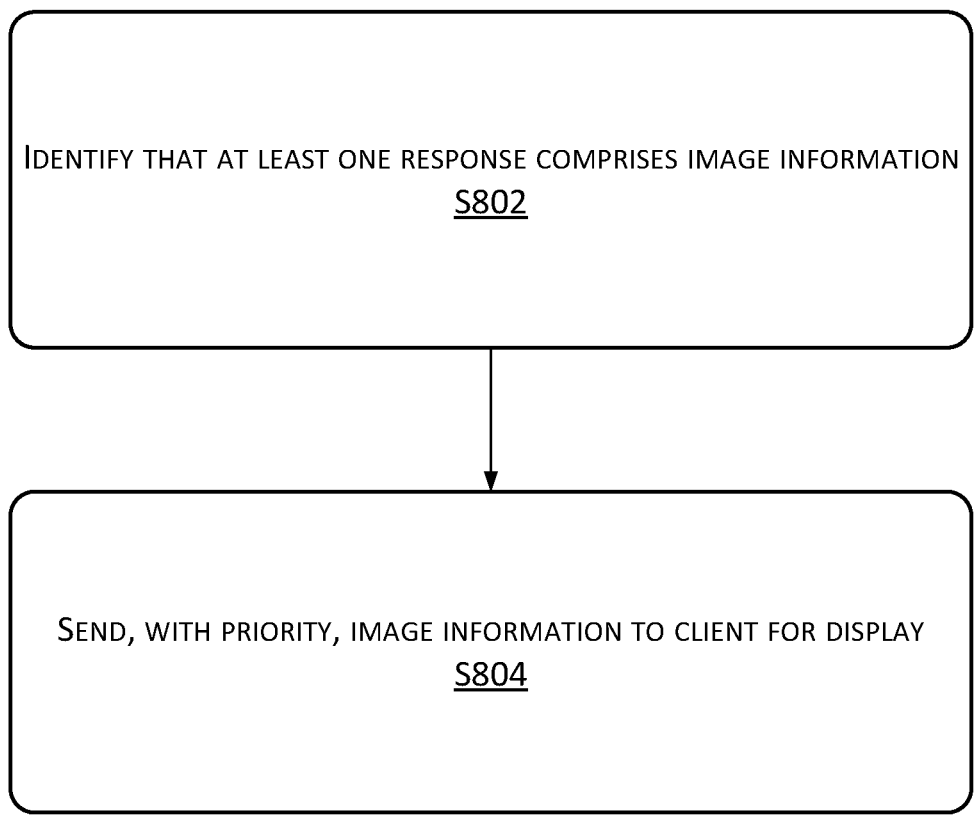
FIG. 8 is a schematic flow chart for sending the at least one response to a client corresponding to the to-be-processed information provided according to an embodiment of the present disclosure.

FIG. 8 is a schematic flow chart for sending the at least one response to a client corresponding to the to-be-processed information provided according to an embodiment of the present disclosure. On the basis of the embodiments above and still referring to FIG. 8, if the response includes at least one of the following: image information and text information, the sending the at least one response to a client corresponding to the to-be-processed information in this embodiment may comprise:

step S802: identifying whether the at least one response comprises image information; and step S804: if so, sending, with a priority, the image information to the client for display.

The acquired at least one response may include image information and/or text information. In order to further achieve fast and accurate feedback for the to-be-processed information, whether the at least one response includes image information may be identified. For example, different types of information may correspond to different information characteristics. Therefore, whether the at least one response includes image information may be identified through identifying an information characteristic included in the at least one response. When the at least one response includes image information, the image information is sent, with a high priority, to the client for display. For example, when the at least one response includes text information and image information, the image information included in the at least one response may be sent, with a high priority, to the client for display.

In other examples, when the at least one response includes image information and text information, the image information and the text information may be simultaneously sent to the client for display.

Through identifying whether the at least one response includes image information, and when the at least one response includes image information, sending the image information, with a high priority, to the client for display, this embodiment effectively enables the client to intuitively learn the response corresponding to the to-be-processed information through the displayed image information, and accordingly facilitating enhancing user experiences.

Figure 9:
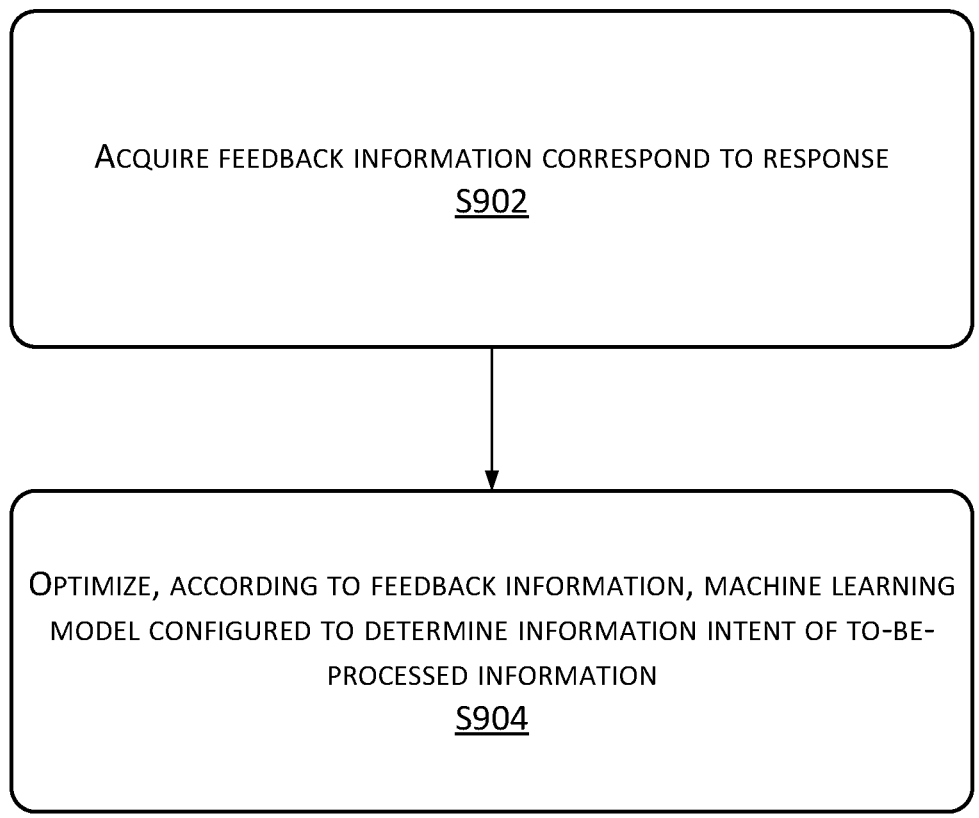
FIG. 9 is a schematic flow chart of another information processing method for a real-time video application provided according to an embodiment of the present disclosure.

FIG. 9 is a schematic flow chart of another information processing method in a live streaming session provided according to an embodiment of the present disclosure. On the basis of the embodiments above and still referring to FIG. 9, the method in this embodiment may further comprise:

step S902: acquiring feedback information corresponding to the response; and step S904: optimizing, according to the feedback information, a machine learning model configured to determine the information intent of the to-be-processed information.

After the response is sent to the client, the user may input an execution operation for the response by means of the client. The execution operation may include a closing operation, a viewing operation, a redirecting operation, or the like. An information processing apparatus may acquire the feedback information corresponding to the response by means of the client. It should be understood that the feedback information may include positive feedback information and negative feedback information. For example, the positive feedback information is configured to mark that the user has performed a positive execution operation on the displayed response, and the negative feedback information is configured to mark that the user has performed a negative execution operation on the displayed response.

In some examples, the acquiring the feedback information corresponding to the response may include: if a closing operation performed on the response is acquired, generating negative feedback information corresponding to the response; and if a viewing operation or a redirecting operation performed on the response is acquired, generating positive feedback information corresponding to the response.

For example, if a closing operation performed on the response is acquired, this indicates that the user is not interested in the displayed response, and accordingly, negative feedback information corresponding to the response may be generated. If a viewing operation or a redirecting operation performed on the response is acquired, this indicates that the user is relatively interested in the displayed response, and accordingly, positive feedback information corresponding to the response may be generated.

After the feedback information corresponding to the response is acquired, the feedback information may be analyzed and processed. Based on an analysis and processing result, the machine learning model configured to determine the information intent of the to-be-processed information may be optimized, so as to further improve the accuracy and reliability in determining the response.

It should be noted that after the feedback information corresponding to the response is acquired, the feedback information may be used to optimize not only the machine learning model, but also the entire information processing algorithm configured to generate a response, thereby enhancing the accuracy and reliability in determining the response.

Through acquiring the feedback information corresponding to the response and optimizing the machine learning model configured to determine the information intent of the to-be-processed information according to the feedback information, this embodiment effectively achieves displaying the response that the user desires to know through the client. In addition, the feedback information inputted by the user for the response is acquired through the client, and then the machine learning model configured to generate a response may be optimized on the basis of the feedback information, thereby improving the accuracy in determining the response, and further improving the stability and reliability of the method during use.

Figure 10:
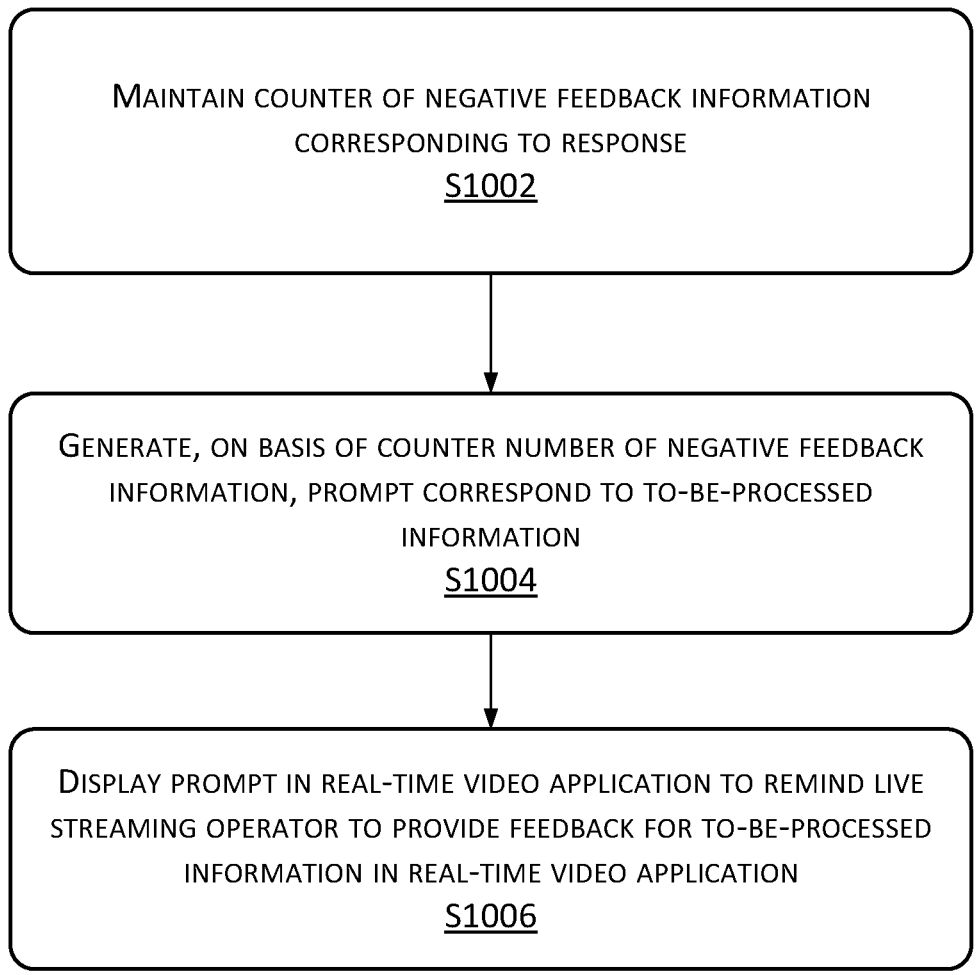
FIG. 10 is a schematic flow chart of yet another information processing method for a real-time video application provided according to an embodiment of the present disclosure.

FIG. 10 is a schematic flow chart of yet another information processing method in a live streaming session provided according to an embodiment of the present disclosure. On the basis of the embodiments above and still referring to FIG. 10, the method in this embodiment may further comprise:

step S1002: maintaining a counter of the negative feedback information corresponding to the response;

step S1004: generating, on the basis of the counter number of the negative feedback information, a prompt corresponding to the to-be-processed information; and step S1006: displaying the prompt in the real-time video application to notify that feedback is needed for the to-be-processed information in the real-time video application.

If different clients send the same to-be-processed information to the information processing apparatus, the information processing apparatus may generate a response corresponding to the to-be-processed information and send the response to these different clients. After the different clients have acquired the response, users may input execution operations for the response using the different clients, such that positive feedback information and negative feedback information may be generated.

If multiple pieces of negative feedback information corresponding to the same response are acquired, this indicates that the generated response does not fulfill the information intent corresponding to the to-be-processed information. Therefore, the generated response does not meet the user's demand. In this case, in order to enable timely feedback with respect to the to-be-processed information, a counter of the negative feedback information corresponding to the response may be maintained. After the counter of the negative feedback information is acquired, the prompt corresponding to the to-be-processed information may be generated on the basis of the counter number of the negative feedback information. For example, the counter number of the negative feedback information may be analyzed and compared against a preset counter threshold. If the counter number of the negative feedback information is greater than the preset counter threshold, this means that the generated response does not meet the requirement information corresponding to the user. In this case, the prompt corresponding to the to-be-processed information may be generated on the basis of the counter number of the negative feedback information. The prompt may be displayed in the real-time video application (for example, a live streaming session), so as to remind a live streaming operator to provide feedback for the to-be-processed information in the real-time video application.

Through maintaining the counter of negative feedback information corresponding to the response, generating the prompt corresponding to the to-be-processed information on the basis of the counter number of the negative feedback information, and displaying the prompt in the live streaming session, this embodiment effectively achieves the following: when the response obtained by the above information processing method does not meet the users' requirements, the prompt may be displayed in the real-time video application, and the displayed prompt may remind the live streaming operator to provide feedback for the to-be-processed information in the real-time video application. In this way, flexible and reliable information processing is achieved, which further enhances the practical value of the method.

Figure 11:
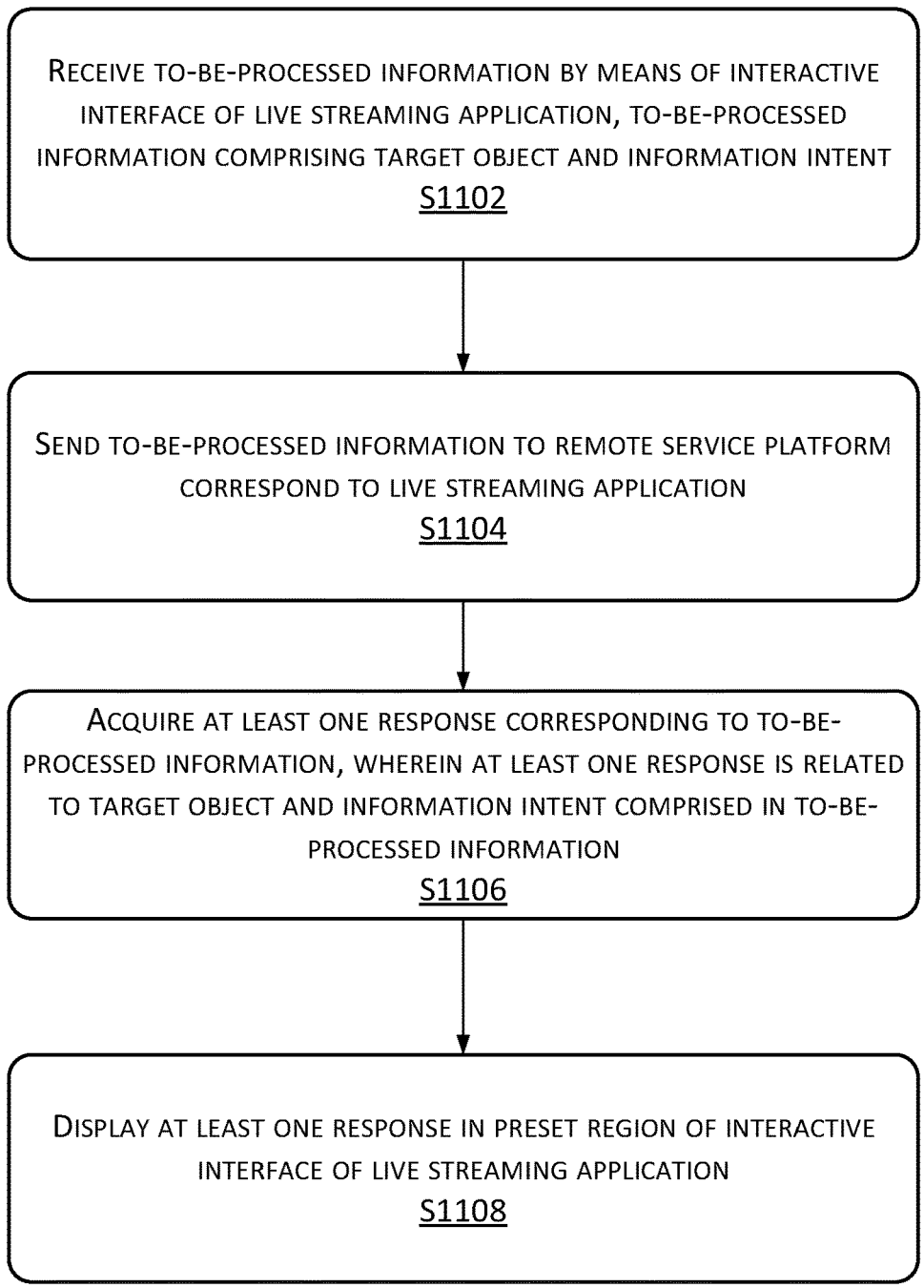
FIG. 11 is a schematic flow chart of an information processing method for interactive information during live streaming provided according to another embodiment of the present disclosure.

FIG. 11 is a schematic flow chart of an information processing method for interactive information during live streaming provided according to another embodiment of the present disclosure. With reference to FIG. 11, this embodiment provides another information processing method for interactive information during live streaming, and the execution entity of this method may be a client. It should be understood that the client may be implemented as software or a combination of software and hardware. The client may establish a communication connection with a remote service platform configured to support acquisition of a live streaming session. For example, the information processing method for interactive information during live streaming may comprise:

step S1102: receiving to-be-processed information by means of an interactive interface of a live streaming application, the to-be-processed information comprising a target object and an information intent;

step S1104: sending the to-be-processed information to a remote service platform corresponding to the live streaming application;

step S1106: acquiring at least one response corresponding to the to-be-processed information, wherein the at least one response is related to the target object and the information intent comprised in the to-be-processed information; and step S1108: displaying the at least one response in a preset region of the interactive interface of the live streaming application.

The above steps are described in detail below.

Step S1102: receiving the to-be-processed information by means of the interactive interface of the live streaming application, the to-be-processed information comprising the target object and the information intent.

The client may be provided with a display module, and the interactive interface of the live streaming application may be displayed using the display module. The user may input an execution operation on the interactive interface of the live streaming application. The to-be-processed information corresponding to the execution operation may be generated on the basis of the obtained execution operation, and the to-be-processed information may include a target object and an information intent.

Step S1104: sending the to-be-processed information to the remote service platform corresponding to the live streaming application.

After the to-be-processed information is acquired, the to-be-processed information may be sent to the remote service platform corresponding to the live streaming application. For example, during the live streaming process on the remote service platform, the content related to the live streaming session may be displayed on a display interface. As shown in FIG. 1, the following information may be shown on the interface: a live streaming operator, an information object included in the live streaming session, and the obtained at least one piece of to-be-processed information having an interactive operation with the live streaming session. There may be one or more live streaming operators, and the information objects included in the live streaming sessions may include an information object currently being broadcast and showcased and an information object, which has been showcased.

During the live streaming process, users may send to-be-processed information in the live streaming session through the clients, and there may be one or more pieces of the to-be-processed information. The remote service platform may steadily acquire the to-be-processed information sent by the clients in the live streaming session. In general, the to-be-processed information is related to at least one information object corresponding to the remote service platform.

Step S1106: acquiring the at least one response corresponding to the to-be-processed information, wherein the at least one response is related to the target object and the information intent comprised in the to-be-processed information.

After the remote service platform acquires the to-be-processed information, the to-be-processed information may be analyzed and identified, so as to identify the target object and information intent corresponding to the to-be-processed information. Then, the at least one response corresponding to the to-be-processed information is determined according to the target object and information intent, and the at least one response may be sent to the client corresponding to the to-be-processed information. As such, the client may acquire the at least one response corresponding to the to-be-processed information. For example, the obtained at least one response is related to the target object and information intent corresponding to the to-be-processed information. It should be understood that the obtained at least one response being related to the target object and information intent corresponding to the to-be-processed information means that the association level between the response and the target object and the information intent is greater than or equal to a preset threshold.

It should be noted that the specific implementation manners and implementation effect of the remote service platform determining the at least one response corresponding to the to-be-processed information are the same as the specific implementation manners and implementation effect in the embodiment corresponding to FIG. 2. The detail may be found in the above description and is not further elaborated herein.

Step S1108: displaying the at least one response in the preset region of the interactive interface of the live streaming application.

After the at least one response is acquired, the at least one response is displayed by means of the preset region of the interactive interface of the live streaming application at the client, thereby enabling the user to acquire, in a fast and timely manner, the at least one response corresponding to the to-be-processed information using the client.

By receiving to-be-processed information through an interactive interface of a live streaming application, sending the to-be-processed information to a remote service platform corresponding to the live streaming application, acquiring at least one response corresponding to the to-be-processed information, and then displaying the at least one response in a preset region, the information processing method for interactive information during live streaming provided by this embodiment effectively reduces the time that users need to wait after their inquiry operations and enhances user experiences. In addition, the displayed response directly provides the user with rich information, such as a buyer-uploaded picture, etc., thus accordingly assisting the user in making a purchase decision and further indirectly guiding the user to visit an online store, thereby further enhancing the practical value of the method.

Figure 12:
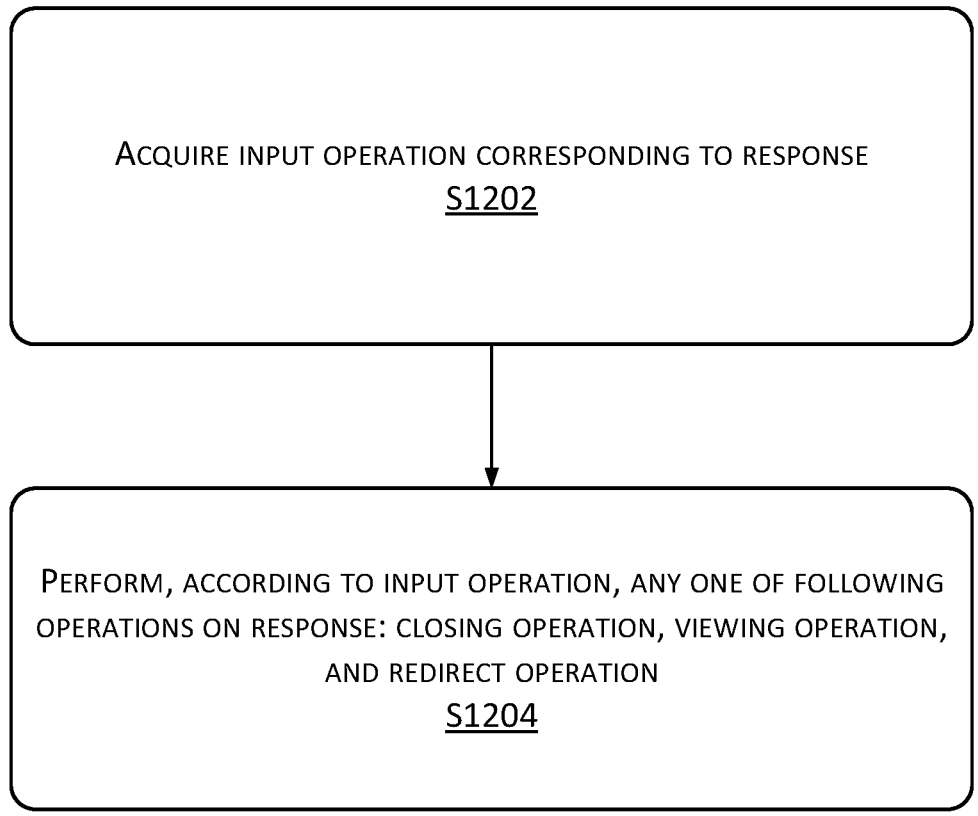
FIG. 12 is a schematic flow chart of another information processing method for interactive information during live streaming provided according to another embodiment of the present disclosure.

FIG. 12 is a schematic flow chart of another information processing method for interactive information during live streaming provided according to another embodiment of the present disclosure. On the basis of the embodiments above and still referring to FIG. 12, the method in this embodiment may further comprise:

step S1202: acquiring an input operation corresponding to the response; and step S1204: performing, according to the input operation, any one of the following operations on the response: a closing operation, a viewing operation, and a redirecting operation.

After the response is acquired, the client may display the response using the display interface. At this point, the user may input different execution operations for the response, such that the client may acquire the execution operations inputted for the response, and perform, based on the execution operations, any one of the following operations on the response, for example: a closing operation, a viewing operation, a redirecting operation, and the like.

For example, the closing operation corresponds to a first execution operation (for example, the operation of clicking on a preset control item "X" located in and corresponding to the response); the viewing operation corresponds to a second execution operation (for example, the operation of clicking on the response); and the redirecting operation corresponds to a third execution operation (for example, the operation of clicking on a preset control item "Next" located in the response). Therefore, the user inputting the first execution operation for the response may implement the closing operation of the response; the user inputting the second execution operation for the response may implement the viewing operation of the response; and the user inputting the response for the third execution operation may implement the redirecting operation of the response. As such, flexible and timely interactive operations between the live streaming session and the user may be achieved, which further enhances the flexibility and reliability of the method.

It should be noted that the operations allowed to be performed on the response are not limited to the operations stated in the embodiment above. A person skilled in the art may add or modify the operations allowed to be performed on the response according to specific application requirements and design requirements. Such examples include performing a marking operation on the response, performing an export operation on the response, and the like, which are not elaborated herein.

Figure 13:
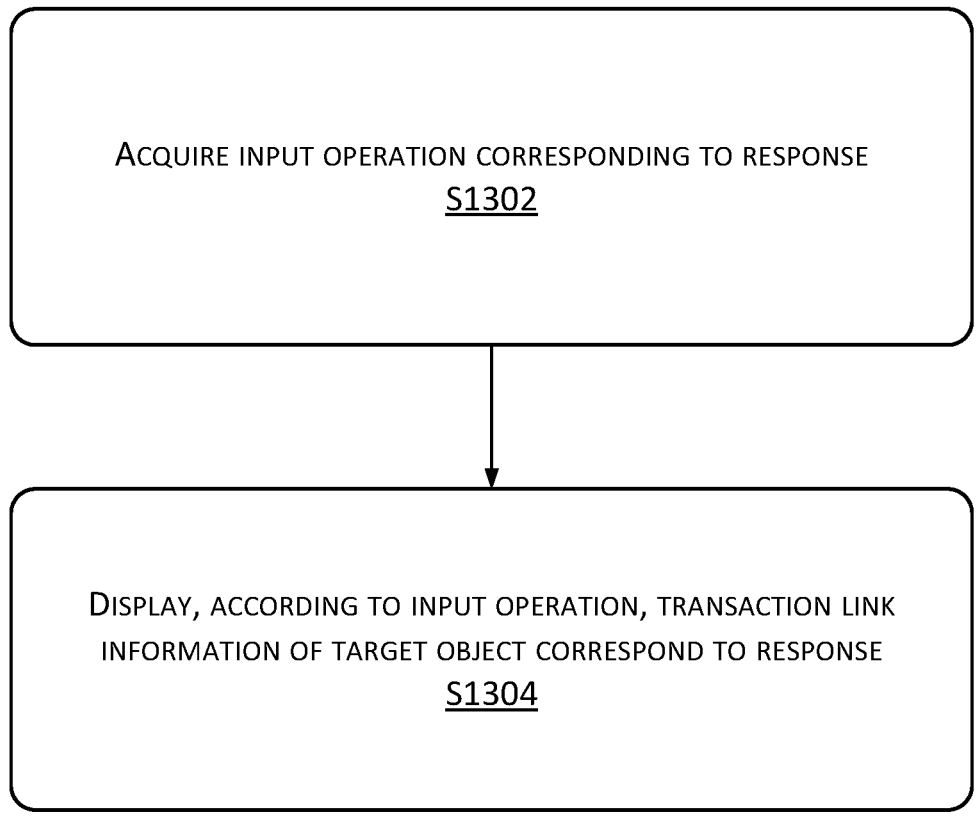
FIG. 13 is a schematic flow chart of yet another information processing method for interactive information during live streaming provided according to another embodiment of the present disclosure.

FIG. 13 is a schematic flow chart of yet another information processing method for interactive information during live streaming provided according to another embodiment of the present disclosure. On the basis of the embodiments above and still referring to FIG. 13, the method in this embodiment may further comprise:

step S1302: acquiring an input operation corresponding to the response; and step S1304: displaying, according to the input operation, transaction link information of a target object corresponding to the response.

After the response is acquired, the client may display the response using the display interface. At this point, the user may input an execution operation for the response, such that the client may acquire the execution operation inputted for the response, and display, based on the above execution operation, transaction link information of a target object corresponding to the response. In this way, rich information may be directly provided to the user, for example, a buyer-uploaded picture, etc., and the response may be used to indirectly guide the user to visit an online store, and assist the user in making a purchase decision, thereby effectively enhancing the practical value of the method.

Figure 14:
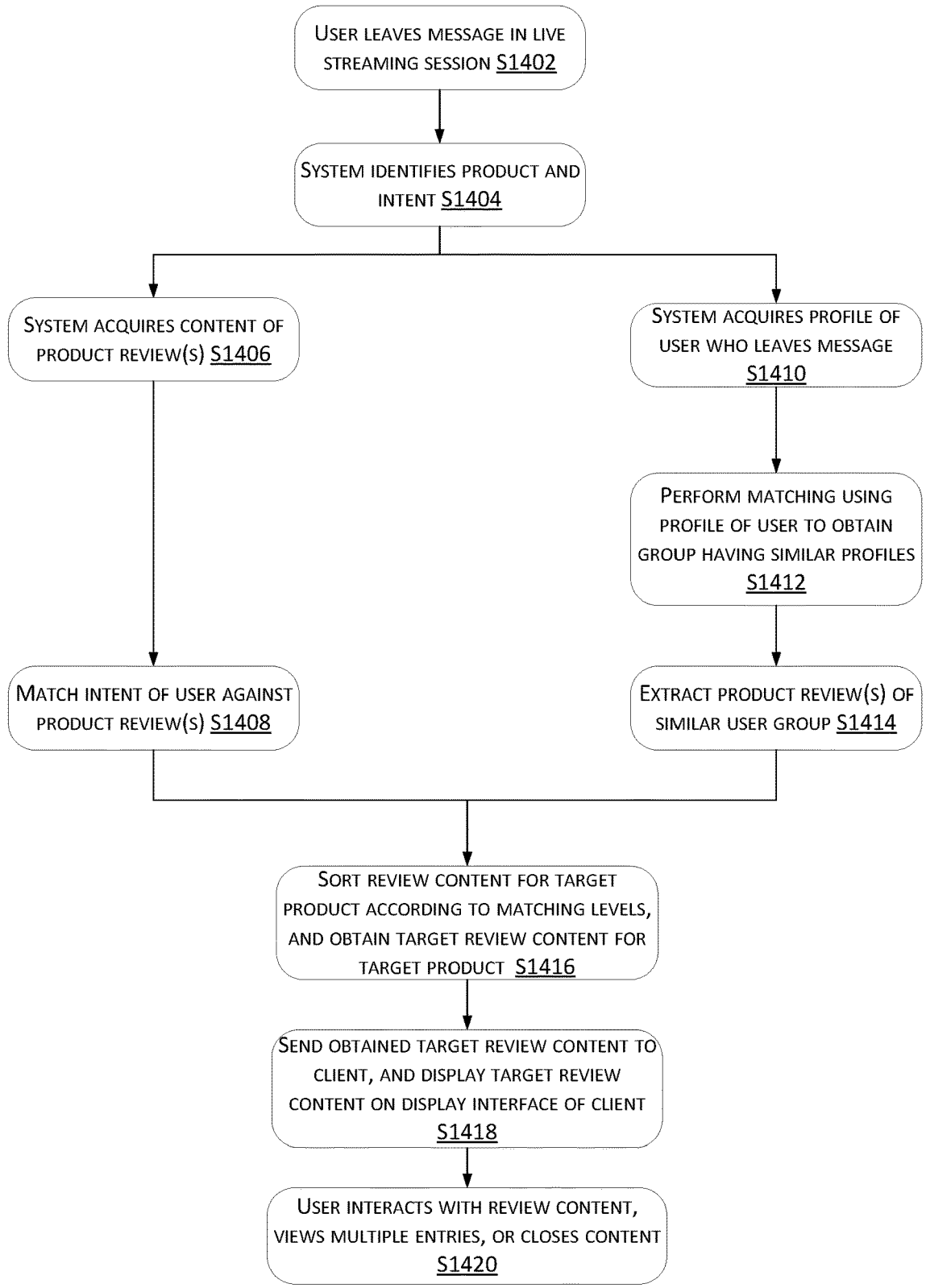
FIG. 14 is a schematic flow chart of an information processing method for a live streaming application platform provided according to an application embodiment of the present disclosure.

In a specific application scenario, as shown in FIG. 14, this application embodiment provides an information processing method for a real-time video application. When a user in a live streaming session sends an inquiry question, this method may provide, on a client, a quick and timely automatic pop-up of a response corresponding to the inquiry question. The response may include: an authentic review summary and a direct response. As such, this method proactively assists live streaming operators to timely handle user inquiries when the inquiries are just made, and avoids the situation where a less desired response is determined for users' concern when the concern of the user inquiries is ignored, which leads to a failure in solving the problem for users. For example, the method in this embodiment comprises the following steps.

Step S1402: a user leaves a message in a live streaming session using a client.

During the live streaming viewing, the user may want to learn about the reviews or quality of a certain product in real-time. In this case, the user may leave a message in the live streaming session to ask questions about the review, quality, size, material, and the like of the product of interest. A real-time response to a user's interactive operation in live streaming scenarios is then achieved accordingly.

Step S1404: after the message is acquired at the live streaming end, the message may be analyzed and processed to identify product information and an information intent to which the message is directed.

After the message is acquired in the live streaming session, the product information may be identified. For example, if the user message contains an identifiable product description, for example, a corresponding number of the product in the live streaming session, a target product corresponding to the message may be obtained by parsing the message using a text matching algorithm. If the target product corresponding to the message cannot be directly identified, current text information corresponding to the live streaming session may be acquired using a speech-to-text technique; the product being showcased is determined on the basis of the current text information; and then the product being showcased is determined to be the target product corresponding to the message of the user.

After the target product is acquired, a deep learning-based text classification algorithm is employed to identify the intent of the message content, such that the inquiry purpose for the target product may be acquired, for example: desiring to acquire the product quality, desiring to acquire the product size, desiring to acquire the product material, etc.

Step S1406: acquire the content of product review(s).

The live streaming end is communicatively connected to an e-commerce platform database configured to store data related to the target product. Therefore, after the target product is acquired, the product review content may be acquired on the basis of identity identifier information of the target product. The product review content may include overall review keywords and the number of reviews for the product, buyer-uploaded information, and all of the other valid reviews.

Step S1408: match a user intent against the product reviews.

Matching and screening are performed with respect to the acquired user intent and the product review content. For example, a text keyword extraction algorithm may be used to extract keywords from the product reviews, such that the product reviews may be labeled for keyword and intent matching. For example, the text keyword extraction algorithm may include at least one of the following: the term frequency-inverse document frequency (TF-IDF) algorithm, keyword extraction such as TextRank, etc.

Next, a deep learning-based text retrieval matching algorithm may be used to match the intent against review text. That is, the specific intent of the message from the user is matched against the product reviews and key descriptive information thereof, and the resulting matching levels are kept aside for subsequent sorting.

Step S1410: acquire a characteristic of the user who leaves a message.

For example, on the basis of an identity identifier of the user who leaves a message in the live streaming session, the live streaming end is communicatively connected to an e-commerce platform database configured to store related data of the messaging user, such that a key profile indicator of the messaging user may be acquired. The key profile indicator may include at least one of the following: a brand preference, a cost-effectiveness ratio preference, a recent demand of products, and the like.

Step S1412: perform matching using profile of user to obtain user group having similar profiles. For example, S1412 may include acquire profile characteristics corresponding to past users corresponding to the product review content, match the profile characteristics corresponding to the past users against the characteristics of the messaging user, and determine a similar user group corresponding to the messaging user.

For example, for profile information of the messaging user in the current live streaming session and the profile characteristics corresponding to the past users, a similarity recommendation algorithm is used to determine matching levels between the profile information of the messaging user and the profile characteristics corresponding to the respective past users. The similar user group corresponding to the messaging user is determined on the basis of the matching levels, and the matching levels corresponding to the similar user group are kept aside.

Step S1414: extract product review(s) published by the similar user group.

After the similar user group is acquired, the review content published by the group regarding the target product may be acquired.

Step S1416: sort the review content for the target product according to the matching levels, and obtain target review content for the target product. For example, review summaries, buyer-uploaded information, and review detail after matching are sorted.

For example, the review content of the target product may be sorted for the matching levels based on first matching levels between an information intent and the review content of the target product and second matching levels between the profile information of the messaging user and the profile features corresponding to the past users. For a specific implementation, weighted summation may be performed for the review content based on the first matching levels and the second matching levels, so as to obtain a final sorted structure of the review content, such that the review content is sorted in a comprehensive manner according to the matching levels and recommendation levels on the basis of the review keywords, buyer-uploaded information, positive reviews, and other valid reviews, thereby guaranteeing that the obtained review content meets the user demand.

Step S1418: send the obtained target review content to the client, and display the target review content on a display interface of the client. For example, top review summary, buyer-uploaded information, and review detail are shown.

The number of pieces of target review content may be preset. After the preset number of pieces of target review content are acquired, the review content may be displayed on the display interface of the client, and the review content may include buyer-uploaded information, keyword information, valid review information, and the like. When the client displays the target review content, if the target review content includes buyer-uploaded information, a buyer-uploaded picture may be displayed below the keyword. If the target review content does not include buyer-uploaded information, a valid review may be displayed below the keyword. If no target review content is found, a prompt configured to notify the user that "the product currently has no review yet" may be generated.

Step S1420: the user interacts with the target review content displayed on the client. The user may view multiple entries or close the content.

After the client displays the target review content, the user may perform an interactive operation on the target review content by, for example, viewing the next review content or closing the target review content.

For example, if finding the target review content displayed on the client useful, the user may click on the "Next" control item to view more of the target review content. At this point, positive feedback information for the target review content may be acquired. If the user finds the target review content displayed on the client irrelevant, the "Close" control may be clicked. At this point, negative feedback information for the target review content may be acquired.

After the positive feedback information and the negative feedback information is acquired, a machine learning model configured to determine the target review content may be optimized on the basis of the positive feedback information and the negative feedback information. In addition, if the amount of negative feedback information for a piece of target review content is large, this means that the generated target review content does not meet the user demand. Accordingly, a piece of suggestion information may be generated for the message corresponding to the target review content, and the suggestion information is sent to the live streaming end to prompt the host operator in the live streaming session to provide description targeted at some messages, thereby further meeting the user demand.

In some other examples, when the client displays the target review content for the target product, a live streaming session product link corresponding to the target product may be displayed below the target review content. The live streaming session product link is for the user to perform a click operation, so as to guide the user to visit an online store through the fed back target review information, thereby improving the close rate of the product.

In some other examples, when the client displays the target review content for the target product, the user may click on a certain keyword, buyer-uploaded information, or valid review information included in the displayed target review content, such that the user may be redirected to the detail page of the keyword, buyer-uploaded information, or valid review information, thereby enabling the user to view more detailed review content.

Upon comparison with the conventional techniques, the technical solution provided by this embodiment has the following beneficial effects:

(1) Interconnections and linked operations among a real-time user commenting system during live streaming, an e-commerce product review system, and an e-commerce user system are achieved. Data from multiple application fields is combined to assist hosts in handling real-time user inquiries and providing timely responses in live streaming application scenarios, and in providing customized answers to user questions in live streaming sessions, thereby improving user experiences during live streaming;

(2) Multi-dimensional matching and suggestions are achieved. The matching starts from the matching between a subjective intent of a user and product comments to the matching between a user profile and the product comments; finally, the above two aspects are combined to provide suggestions. The multi-dimensional suggestions may provide users with more customized review content which better meets the expectation of the users;

(3) A multi-modal method is used to identify real-time message content of users in a live streaming session; and two technical means, including text parsing and speech parsing, are used to acquire a target product which is of interest in the message content of users; and (4) User interaction is enabled for displayed review content. The system classifies the user interactions into positive feedback and negative feedback, and suggests an action to a host if more negative feedback is found, such that the potential dissatisfaction of users is discovered and addressed in a timely manner, thereby enhancing user experiences.

In summary, the interactive mechanism for live streaming session provided by the embodiments of the present disclosure may be applied to application scenarios such as live streaming sessions or e-commerce application scenarios. When a user in a live streaming session submits an inquiry about a product, at least one response corresponding to the inquiry may be obtained by means of multiple data operations, such as intent identification, matching an intent against product reviews, user profile identification, matching a user profile against product reviews, product review sorting, product review display, user interaction with the displayed product review, etc. In this way, real-time one-to-one interactive operations with users during a live streaming process are effectively achieved, and feedback for user questions are provided quickly. As such, user experiences are enhanced, and users are better assisted in making purchase decisions.

Figure 15:
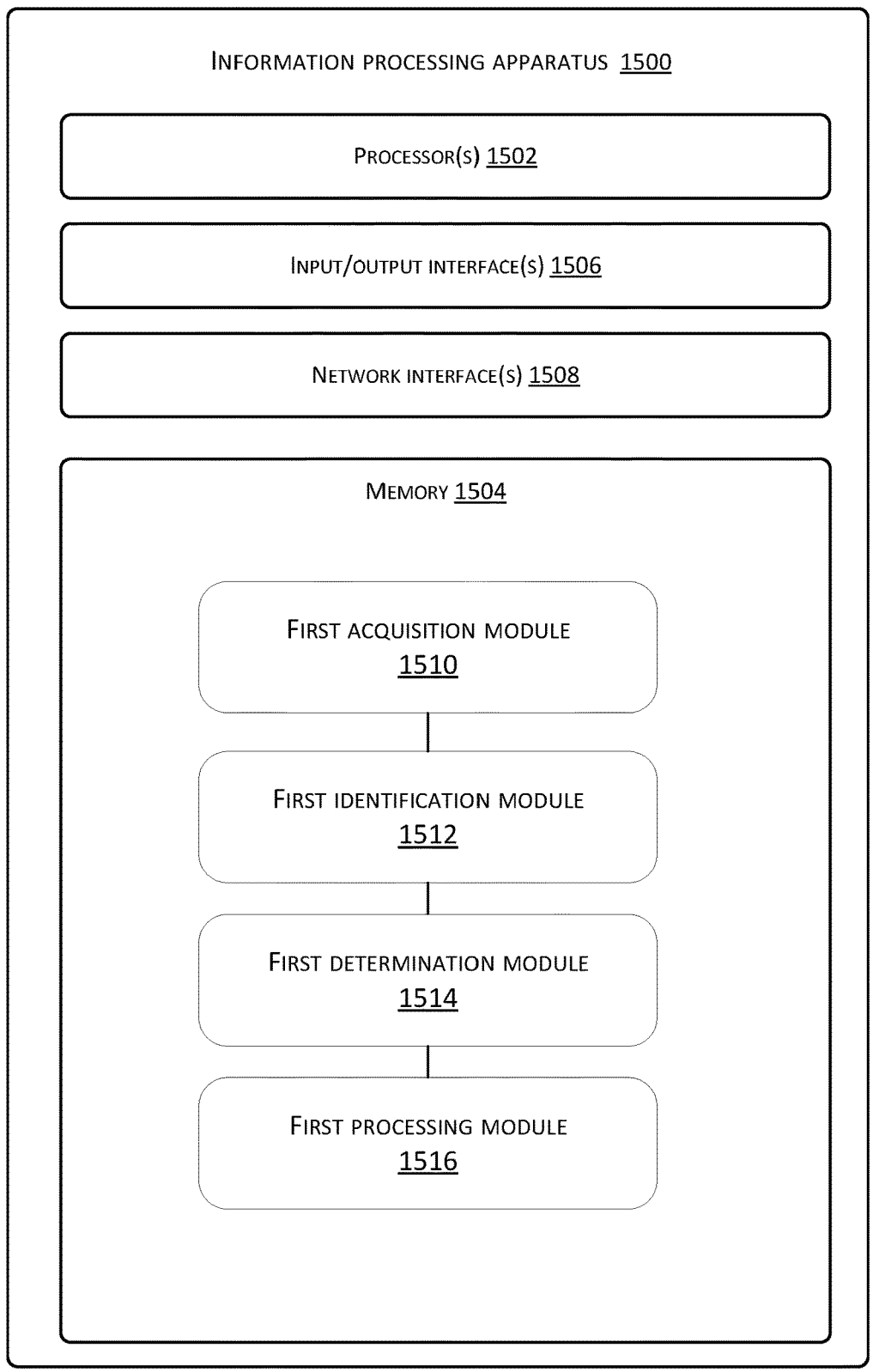
FIG. 15 is a schematic structural diagram of an information processing apparatus for a live streaming application platform provided according to an embodiment of the present disclosure.

FIG. 15 is a schematic structural diagram of an information processing apparatus for a live streaming application platform provided according to an embodiment of the present disclosure. Referring to FIG. 15, this embodiment provides an information processing apparatus 1500 for a live streaming application platform, and the information processing apparatus for a live streaming application platform may execute the information processing method for a live streaming application platform corresponding to FIG. 2. The information processing apparatus 1500 for a live streaming application platform may comprise one or more processor(s) 1502 or data processing unit(s) and memory 1504. The information processing apparatus 1500 may further include one or more input/output interface(s) 1506 and one or more network interface(s) 1508.

The memory 1504 is an example of computer-readable media.

The memory 1504 may store therein a plurality of modules or units including a first acquisition module 1510, a first identification module 1512, a first determination module 1514, and a first processing module 1516, wherein:

the first acquisition module 1510 is configured to acquire to-be-processed information corresponding to a real-time video application, the to-be-processed information comprising at least one of the following: customer identity information and real-time video identification information;

the first identification module 1512 is configured to identify a target object and an information intent corresponding to the to-be-processed information;

the first determination module 1514 is configured to determine, according to the target object and the information intent, at least one response corresponding to the to-be-processed information; and the first processing module 1516 is configured to send the at least one response to a send terminal corresponding to the customer identity information.

In some examples, when the first identification module 1512 identifies the target object corresponding to the to-be-processed information, the first identification module 1512 may be configured to perform: acquiring at least one piece of object identifier information comprised in the to-be-processed information; and determining, on the basis of the at least one piece of object identifier information, at least one target object corresponding to the to-be-processed information.

In some examples, the object identifier information includes at least one of the following: object name information and object number information.

In some examples, when the first identification module 1512 determines, on the basis of the at least one piece of object identifier information, the at least one target object corresponding to the to-be-processed information, the first identification module 1512 may be configured to perform: identifying, on the basis of the at least one piece of object identifier information, at least one information object corresponding to the to-be-processed information; acquiring a current information object related to the currently broadcast content of the real-time video application; if the at least one information object includes the current information object, determining the current information object to be the target object corresponding to the to-be-processed information; and if the at least one information object does not include the current information object, determining the at least one information object to be the target object corresponding to the to-be-processed information.

In some examples, the first processing module 1516 in this embodiment may be configured to perform the following steps: if the object identifier information comprised in the to-be-processed information cannot be identified, acquiring a current information object related to the currently broadcast content of the real-time video application; and determining the current information object to be the target object corresponding to the to-be-processed information.

In some examples, when the first processing module 1516 acquires the current information object related to the currently broadcast content of the real-time video application, the first processing module 1516 may be configured to perform: acquiring the current speech information currently being broadcast by the real-time video application; determining text information corresponding to the current speech information; and analyzing and identifying the text information to acquire the current information object related to the currently broadcast content of the real-time video application.

In some examples, when the first identification module 1512 identifies the information intent corresponding to the to-be-processed information, the first identification module 1512 may be configured to perform: analyzing and identifying, by using a machine learning model, the to-be-processed information to obtain at least one information intent corresponding to the to-be-processed information, wherein the machine learning model is trained to determine an information intent of the to-be-processed information.

In some examples, when the first determination module 1514 determines, according to the target object and the information intent, the at least one response corresponding to the to-be-processed information, the first determination module 1514 may be configured to perform: acquiring historical data corresponding to the target object; and determining, from the historical data, the at least one response matching the information intent.

In some examples, the response includes at least one of the following: a review keyword, a transaction quantity, a valid review, application status information, and an intent response, wherein the valid review comprises at least one of the following: pre-transaction data and post-transaction data.

In some examples, when the first determination module 1514 determines, from the historical data, the at least one response matching the information intent, the first determination module 1514 may be configured to perform: acquiring an information label corresponding to the historical data and an intent label corresponding to the information intent; determining, on the basis of the information label and the intent label, a matching level between the historical data and the information intent; and determining, on the basis of the matching level between the historical data and the information intent, the at least one response matching the information intent.

In some examples, when the first determination module 1514 determines, on the basis of the matching level between the historical data and the information intent, the at least one response matching the information intent, the first determination module 1514 may be configured to perform: sorting, in a descending order, all pieces of the historical data according to matching levels between the historical data and the information intent to obtain first sorted information of all pieces of the historical data; acquiring a first number configured to limit the number of; and determining the first number of leading pieces of the historical data in the first sorted information to be the at least one response matching the information intent.

In some examples, after the at least one response corresponding to the to-be-processed information is determined, the first acquisition module 1510, the first determination module 1514, and the first processing module 1516 in this embodiment may be configured to perform the following steps:
the first acquisition module 1510 is configured to acquire first profile information corresponding to the to-be-processed information and at least one piece of second profile information corresponding to the response;
the first determination module 1514 is configured to determine, from the at least one piece of second profile information, target profile information corresponding to the first profile information; and
the first processing module 1516 is configured to determine a response corresponding to the target profile information to be the response corresponding to the to-be-processed information.

In some examples, when the first determination module 1514 determines, from the at least one piece of second profile information, the target profile information corresponding to the first profile information, the first determination module 1514 may be configured to perform: acquiring a matching level between the first profile information and each of the at least one piece of second profile information; and determining, on the basis of the matching level and from the at least one piece of second profile information, the target profile information corresponding to the first profile information.

In some examples, when the first determination module 1514 determines, on the basis of the matching level and from the at least one piece of second profile information, the target profile information corresponding to the first profile information, the first determination module 1514 may be configured to perform: sorting, in a descending order, all pieces of the second profile information according to matching levels between the pieces of the second profile information and the first profile information to obtain second sorted information for all pieces of the second profile information; acquiring a second number configured to limit the number of the target profile information; and determining the second number of leading pieces of the second profile information in the second sorted information to be the at least one piece of target profile information corresponding to the first profile information.

In some examples, the response includes at least one of the following: image information and text information. When the first processing module 1516 sends the at least one response to the client corresponding to the to-be-processed information, the first processing module 1516 may be configured to perform: identifying whether the at least one response includes image information; and if so, sending, with a high priority, the image information to the client for display.

In some examples, the first acquisition module 1510 and the first processing module 1516 in this embodiment may be respectively configured to perform the following steps:
the first acquisition module 1510 is configured to acquire feedback information corresponding to the response; and
the first processing module 1516 is configured to optimize, according to the feedback information, a machine learning model configured to determine the information intent of the to-be-processed information.

In some examples, when the first acquisition module 1510 acquires the feedback information corresponding to the response, the first acquisition module 1510 may be configured to perform: if a closing operation performed on the response is acquired, generating negative feedback information corresponding to the response; and if a viewing operation or a redirecting operation performed on the response is acquired, generating positive feedback information corresponding to the response.

In some examples, the first processing module 1516 in this embodiment may be configured to perform: maintaining a counter of the negative feedback information corresponding to the response; generating, on the basis of the counter number of the negative feedback information, a prompt corresponding to the to-be-processed information; and displaying the prompt in the real-time video application to remind a live streaming operator to provide feedback for the to-be-processed information in the real-time video application.

The apparatus shown in FIG. 15 may execute the methods in the embodiments shown in FIG. 1 to FIG. 10. Regarding the parts that are not described in detail in this embodiment, reference may be made to the related description of the embodiments shown in FIG. 1 to FIG. 10. With regard to the implementation process and technical effect of this technical solution, reference may be made to the description of the embodiments shown in FIG. 1 to FIG. 10. Details are not repeated herein.

Figure 16:
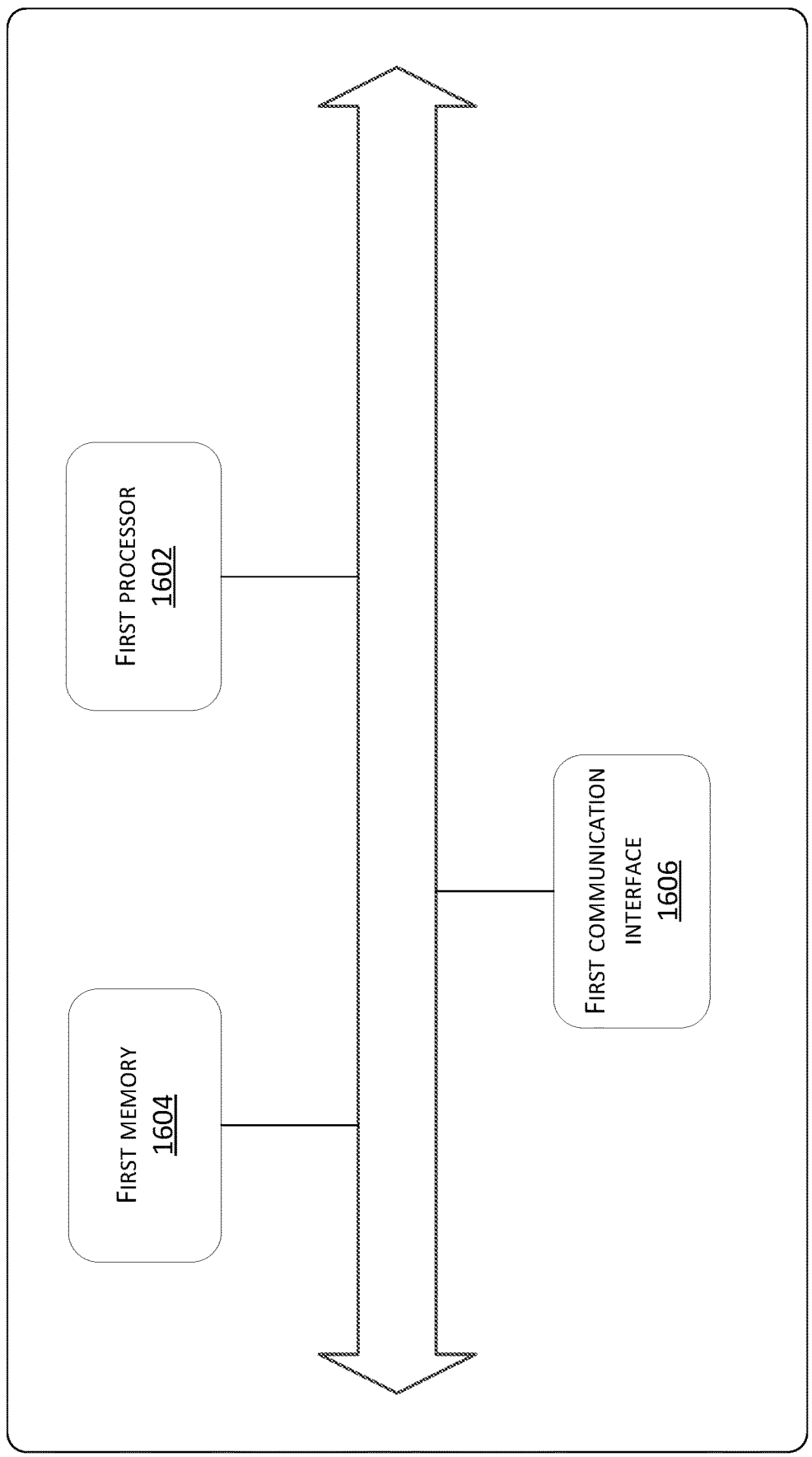
FIG. 16 is a schematic structural diagram of an electronic device corresponding to the information processing apparatus for a live streaming application platform provided according to the embodiment shown in FIG. 15.

In a possible design, the structure of the information processing apparatus for a live streaming session shown in FIG. 15 may be implemented as an electronic device, and the electronic device may be one of the various types of devices, such as a mobile phone, a tablet computer, a server, and the like. As shown in FIG. 16, the electronic device may include a first processor 1602 and a first memory 1604. The first memory 1604 is configured to store a program for the corresponding electronic device to execute the information processing method for a live streaming session provided in the embodiments shown in FIGS. 1-10. The first processor 1602 is configured to execute the program stored in the first memory 1604.

The program includes one or more computer instructions which, when executed by the first processor 1602, implement the following steps:
  acquiring to-be-processed information corresponding to a real-time video application, the to-be-processed information comprising at least one of the following: customer identity information and real-time video identification information;
  identifying a target object and an information intent corresponding to the to-be-processed information;
  determining, according to the target object and the information intent, at least one response corresponding to the to-be-processed information; and
  sending the at least one response to a send terminal corresponding to the customer identity information.

Further, the first processor 1602 is further configured to perform all or part of the steps in the foregoing embodiments shown in FIGS. 1-10.

The structure of the electronic apparatus may further comprise a first communication interface 1606 for the electronic device to communicate with another device or with a communication network.

In addition, an embodiment of the present disclosure provides a computer storage medium, configured to store computer software instructions for an electronic device, and the instructions comprise the program involved for executing the information processing method for a live streaming session in the method embodiments shown in FIGS. 1-10.

Figure 17:
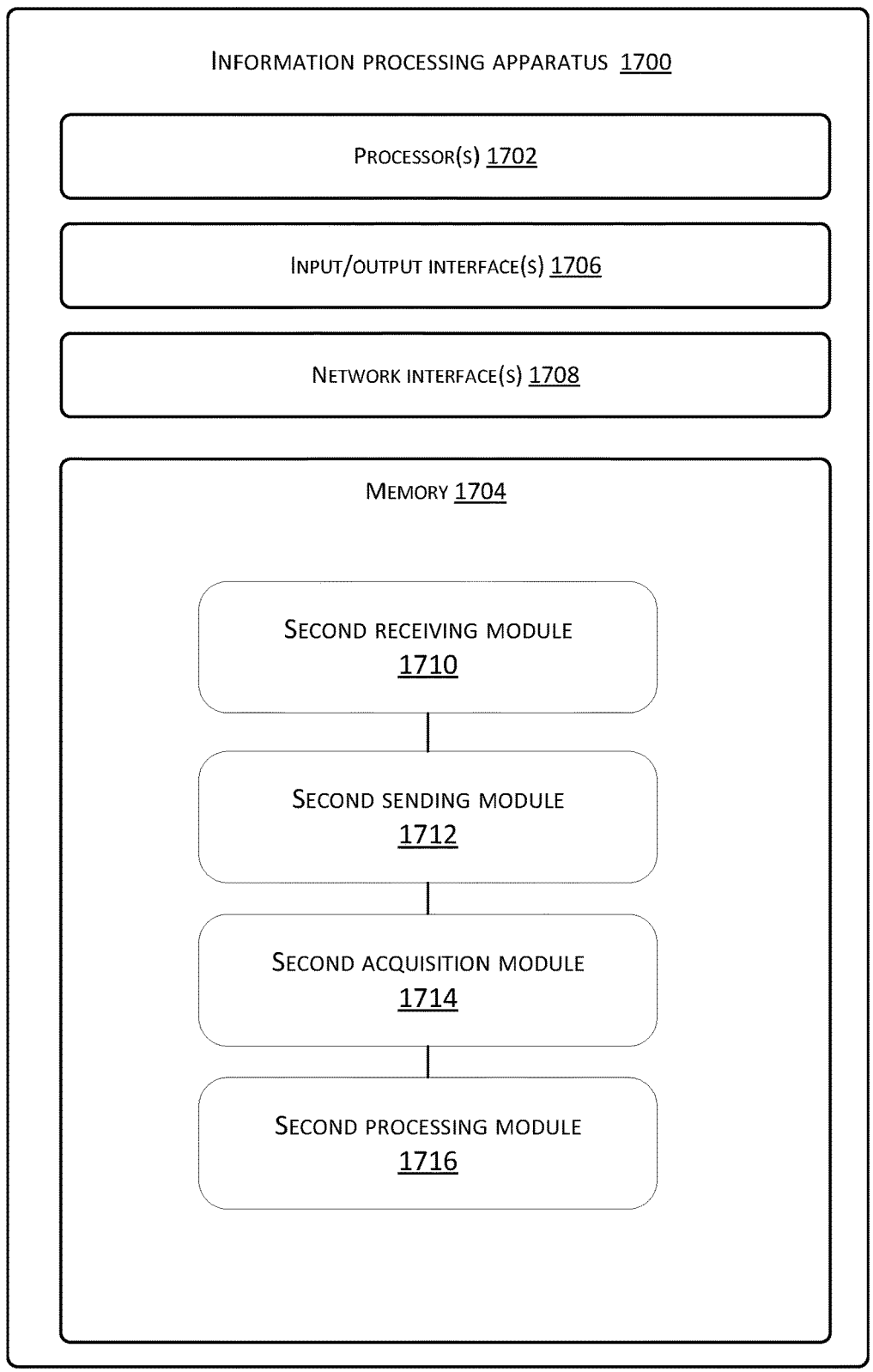
FIG. 17 is a schematic structural diagram of another information processing apparatus for interactive information during live streaming provided according to an embodiment of the present disclosure.

FIG. 17 is a schematic structural diagram of another information processing apparatus for interactive information during live streaming provided according to an embodiment of the present disclosure. Referring to FIG. 17, this embodiment provides another information processing apparatus 1700 for interactive information during live streaming. The information processing apparatus 1700 for interactive information during live streaming may execute the information processing method for interactive information during live streaming corresponding to FIG. 11. The information processing apparatus 1700 for interactive information during live streaming may comprise one or more processor(s) 1702 or data processing unit(s) and memory 1704. The information processing apparatus 1700 may further include one or more input/output interface(s) 1706 and one or more network interface(s) 1708.

The memory 1704 is an example of computer-readable media.

The memory 1704 may store therein a plurality of modules or units including a second receiving module 1710, a second sending module 1712, a second acquisition module 1714, and a second processing module 1716. For example, the second receiving module 1710 is configured to receive to-be-processed information by means of an interactive interface of a live streaming application, the to-be-processed information comprising a target object and an information intent;
  the second sending module 1712 is configured to send the to-be-processed information to a remote service platform corresponding to the live streaming application;
  the second acquisition module 1714 is configured to acquire at least one response corresponding to the to-be-processed information, wherein the at least one response is related to the target object and the information intent comprised in the to-be-processed information; and
  the second processing module 1716 is configured to display the at least one response in a preset region of the interactive interface of the live streaming application.

In some examples, the second acquisition module 1714 and the second processing module 1716 in this embodiment may be further configured to perform the following steps:
  the second acquisition module 1714 is configured to acquire an input operation corresponding to the response;
  the second processing module 1716 is configured to perform, according to the input operation, any one of the following operations on the response: a closing operation, a viewing operation, and a redirecting operation.

In some examples, the second acquisition module 1714 and the second processing module 1716 in this embodiment may be further configured to perform the following steps:
  the second acquisition module 1714 is configured to acquire an input operation corresponding to the response;
  the second processing module 1716 is configured to display, according to the input operation, transaction link information of a target object corresponding to the response.

The apparatus shown in FIG. 17 may execute the methods in the embodiments shown in FIG. 11 to FIG. 14. Regarding the parts that are not described in detail in this embodiment, reference may be made to the related description of the embodiments shown in FIG. 11 to FIG. 14. With regard to the implementation process and technical effect of this technical solution, reference may be made to the description of the embodiments shown in FIG. 11 to FIG. 14. Details are not repeated herein.

Figure 18:
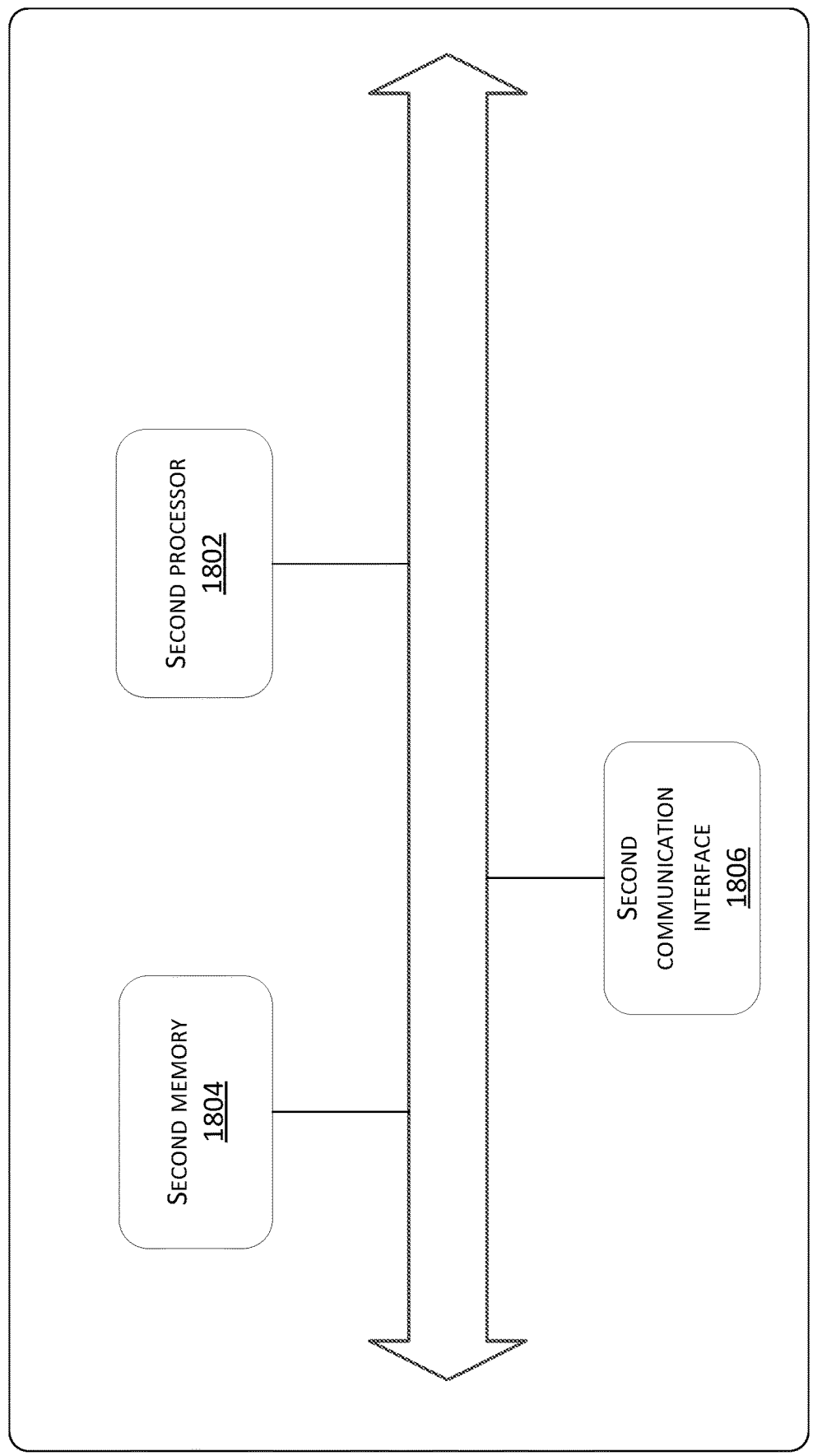
FIG. 18 is a schematic structural diagram of an electronic device corresponding to the information processing apparatus for interactive information during live streaming provided according to the embodiment shown in FIG. 17.

In an exemplary design, the structure of the information processing apparatus for a live streaming session shown in FIG. 17 may be implemented as an electronic device, and the electronic device may be one of the various types of devices, such as a mobile phone, a tablet computer, a server, and the like. As shown in FIG. 18, the electronic device may include a second processor 1802 and a second memory 1804. The second memory 1804 is configured to store a program for the corresponding electronic device to execute the information processing method for a live streaming session provided in the embodiments shown in FIGS. 11-14. The second processor 1802 is configured to execute the program stored in the second memory 1804.

The program includes one or more computer instructions which, when executed by the second processor 1802, implement the following steps:

receiving to-be-processed information by means of an interactive interface of a live streaming application, the to-be-processed information comprising a target object and an information intent;

sending the to-be-processed information to a remote service platform corresponding to the live streaming application;

acquiring at least one response corresponding to the to-be-processed information, wherein the at least one response is related to the target object and the information intent comprised in the to-be-processed information; and displaying the at least one response in a preset region of the interactive interface of the live streaming application.

Further, the second processor 1802 is further configured to perform all or part of the steps in the foregoing embodiments shown in FIGS. 11-14.

The structure of the electronic device may further comprise a second communication interface 1806 for the electronic device to communicate with other devices or communication networks.

In addition, an embodiment of the present disclosure provides a computer storage medium, configured to store computer software instructions for an electronic device, and the instructions comprise the program involved for executing the information processing method for a live streaming session in the method embodiments shown in FIGS. 11-14.

The apparatus embodiments described above are only examples, wherein the units described as separate components may or may not be physically separated; and the components displayed as units may or may not be physical units; that is, the units may be located in one place, or may be distributed on a plurality of network units. Some or all of the modules may be selected according to actual needs to achieve the objectives of the solutions of the embodiments. Those of ordinary skill in the art may understand and implement the embodiments without creative efforts.

Through the description of the above implementations, a person skilled in the art may clearly understand that each implementation may be realized by means of a necessary general hardware platform, and may certainly be implemented by a combination of hardware and software. Based on such an understanding, the part of the above technical solutions, which is essential or contributes to the conventional techniques, may be embodied in the form of a computer product. The present disclosure may take the form of a computer program product which is embodied on one or more computer-usable storage media (including, but not limited to, disk storage, CD-ROM, optical storage, and so forth) having computer-usable program code contained therein.

The present disclosure is described with reference to the flow charts and/or block diagrams of the method, the device (system), and the computer program product according to the embodiments of the present disclosure. It should be understood that computer program instructions may be used to implement each process and/or each block in the flow charts and/or the block diagrams and a combination of a process and/or a block in the flow charts and/or the block diagrams. These computer program instructions may be provided for a general-purpose computer, a dedicated computer, an embedded processor, or a processor of another programmable device to generate a machine, so that the instructions executed by a computer or a processor of another programmable generate an apparatus for implementing a specific function in one or more processes in the flow charts and/or in one or more blocks in the block diagrams.

These computer program instructions may be stored in a computer readable memory that can instruct the computer or another programmable device to work in a specific manner, so that the instructions stored in the computer readable memory generate an artifact that includes an instruction apparatus. The instruction apparatus implements a specific function in one or more processes in the flow charts and/or in one or more blocks in the block diagrams.

These computer program instructions may also be loaded onto a computer or another programmable device, so that a series of operation steps are performed on the computer or another programmable device to generate computer-implemented processing. Therefore, the instructions executed on the computer or another programmable device are used to provide steps for implementing a specific function in one or more processes in the flow charts and/or in one or more blocks in the block diagrams.

In a typical configuration, a computing device comprises one or more processors (CPU), an input/output interface, a network interface, and a memory.

The memory may include a volatile memory on a computer-readable medium, a random-access memory (RAM) and/or a non-volatile memory, and the like, such as a read-only memory (ROM) or a flash random access memory (flash RAM). The memory is an example of the computer-readable media.

Computer-readable media further include nonvolatile and volatile, removable and non-removable media employing any method or technique to achieve information storage. The information may be computer readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices or any other non-transmission medium, which may be used to store information that can be accessed by a computing device. As defined herein, the computer-readable media do not include transitory media, such as modulated data signals and carriers Finally, it should be noted that the above embodiments are merely used for illustrating, rather than limiting, the technical solutions of the present disclosure. Although the present disclosure is described in detail with reference to the afore-mentioned embodiments, it should be understood by those of ordinary skill in the art that modifications may still be made to the technical solutions described in the afore-mentioned embodiments, or equivalent substitutions may be applied to part of the technical features therein; and these modifications or substitutions do not cause the essence of corresponding technical solutions to depart from the spirit and scope of the technical solutions in the embodiments of the present disclosure.

The present disclosure may further be understood with clauses as follows:

Clause 1. An information processing method for a real-time video application, the method comprising:
  acquiring to-be-processed information corresponding to a real-time video application, the to-be-processed information comprising at least one of the following: customer identity information and real-time video identification information;
  identifying a target object and an information intent corresponding to the to-be-processed information;
  determining, according to the target object and the information intent, at least one response corresponding to the to-be-processed information; and
  sending the at least one response to a send terminal corresponding to the customer identity information.

Clause 2. The method according to clause 1, wherein the identifying the target object corresponding to the to-be-processed information comprises:
  acquiring at least one piece of object identifier information comprised in the to-be-processed information; and
  determining, on the basis of the at least one piece of object identifier information, at least one target object corresponding to the to-be-processed information.

Clause 3. The method according to clause 2, wherein the object identifier information comprises at least one of the following: object name information and object number information.

Clause 4. The method according to clause 2, wherein the determining, on the basis of the at least one piece of object identifier information, the at least one target object corresponding to the to-be-processed information comprises:
  identifying, on the basis of the at least one piece of object identifier information, at least one information object corresponding to the to-be-processed information;
  acquiring a current information object related to currently broadcast content of the real-time video application;
  if the at least one information object comprises the current information object, determining the current information object to be the target object corresponding to the to-be-processed information; and
  if the at least one information object does not comprise the current information object, determining the at least one information object to be the target object corresponding to the to-be-processed information.

Clause 5. The method according to clause 2, further comprising:
  if the object identifier information comprised in the to-be-processed information cannot be identified, acquiring a current information object related to currently broadcast content of the real-time video application; and
  determining the current information object to be the target object corresponding to the to-be-processed information.

Clause 6. The method according to clause 4, wherein the acquiring the current information object related to the currently broadcast content of the real-time video application comprises:
  acquiring current speech information currently being broadcast by the real-time video application;
  determining text information corresponding to the current speech information; and
  analyzing and identifying the text information to acquire the current information object related to the currently broadcast content of the real-time video application.

Clause 7. The method according to clause 1, wherein the identifying the information intent corresponding to the to-be-processed information comprises:
  analyzing and identifying, by means of a machine learning model, the to-be-processed information to obtain at least one information intent corresponding to the to-be-processed information, wherein the machine learning model is trained to determine an information intent of the to-be-processed information.

Clause 8. The method according to clause 1, wherein the determining, according to the target object and the information intent, the at least one response corresponding to the to-be-processed information comprises:
  acquiring historical data corresponding to the target object; and
  determining, from the historical data, the at least one response matching the information intent.

Clause 9. The method according to clause 8, wherein the response comprises at least one of the following: a review keyword, a transaction quantity, a valid review, application status information, and an intent response, wherein the valid review comprises at least one of the following: pre-transaction data and post-transaction data.

Clause 10. The method according to clause 8, wherein the determining, from the historical data, the at least one response matching the information intent comprises:
  acquiring an information label corresponding to the historical data and an intent label corresponding to the information intent;
  determining, on the basis of the information label and the intent label, a matching level between the historical data and the information intent; and
  determining, on the basis of the matching level between the historical data and the information intent, the at least one response matching the information intent.

Clause 11. The method according to clause 10, wherein the determining, on the basis of the matching level between the historical data and the information intent, the at least one response matching the information intent comprises:
  sorting, in a descending order, all pieces of the historical data according to matching levels between the historical data and the information intent to obtain first sorted information of all pieces of the historical data;
  acquiring a first number configured to limit the number of; and
  determining the first number of leading pieces of the historical data in the first sorted information to be the at least one response matching the information intent.

Clause 12. The method according to any one of clauses 1-11, wherein after the determining the at least one response corresponding to the to-be-processed information, the method further comprises:
  acquiring first profile information corresponding to the to-be-processed information and at least one piece of second profile information corresponding to the response;

determining, from the at least one piece of second profile information, target profile information corresponding to the first profile information; and
determining a response corresponding to the target profile information to be the response corresponding to the to-be-processed information.

Clause 13. The method according to clause 12, wherein the determining, from the at least one piece of second profile information, the target profile information corresponding to the first profile information comprises:
acquiring a matching level between the first profile information with respect to each of the at least one piece of second profile information; and
determining, on the basis of the matching level and from the at least one piece of second profile information, the target profile information corresponding to the first profile information.

Clause 14. The method according to clause 13, wherein the determining, on the basis of the matching level and from the at least one piece of second profile information, the target profile information corresponding to the first profile information comprises:
sorting, in a descending order, all pieces of the second profile information according to matching levels between the pieces of the second profile information and the first profile information to obtain second sorted information of all pieces of the second profile information;
acquiring a second number configured to limit the number of the target profile information; and
determining the second number of leading pieces of the second profile information in the second sorted information to be the at least one piece of target profile information corresponding to the first profile information.

Clause 15. The method according to any one of clauses 1-11, wherein the response comprises at least one of the following: image information and text information, and the sending the at least one response to a client corresponding to the to-be-processed information comprises:
identifying whether the at least one response comprises image information; and
if so, sending, with a high priority, the image information to the client for display.

Clause 16. The method according to any one of clauses 1-11, further comprising:
acquiring feedback information corresponding to the response; and
optimizing, according to the feedback information, the machine learning model configured to determine the information intent of the to-be-processed information.

Clause 17. The method according to clause 16, wherein the acquiring the feedback information corresponding to the response comprises:
if a closing operation performed on the response is acquired, generating negative feedback information corresponding to the response; and
if a viewing operation or a redirecting operation performed on the response is acquired, generating positive feedback information corresponding to the response.

Clause 18. The method according to clause 17, further comprising:
maintaining a counter of the negative feedback information corresponding to the response;
generating, on the basis of the counter number of the negative feedback information, a prompt corresponding to the to-be-processed information; and
displaying the prompt in the real-time video application to prompt a live streaming operator to provide feedback for the to-be-processed information in the real-time video application.

Clause 19. An information processing method for interactive information during live streaming, the method comprising:
receiving to-be-processed information by means of an interactive interface of a live streaming application, the to-be-processed information comprising a target object and an information intent;
sending the to-be-processed information to a remote service platform corresponding to the live streaming application;
acquiring at least one response corresponding to the to-be-processed information, wherein the at least one response is related to the target object and the information intent comprised in the to-be-processed information; and
displaying the at least one response in a preset region of the interactive interface of the live streaming application.

Clause 20. The method according to clause 19, further comprising:
acquiring an input operation corresponding to the response; and
performing, according to the input operation, any one of the following operations on the response: a closing operation, a viewing operation, and a redirecting operation.

Clause 21. The method according to clause 19, further comprising:
acquiring an input operation corresponding to the response; and
displaying, according to the input operation, transaction link information of a target object corresponding to the response.

Clause 22. An information processing apparatus for a live streaming application platform, the apparatus comprising:
a first acquisition module, configured to acquire to-be-processed information corresponding to a real-time video application, the to-be-processed information comprising at least one of the following: customer identity information and real-time video identification information;
a first identification module, configured to identify a target object and an information intent corresponding to the to-be-processed information;
a first determination module, configured to determine, according to the target object and the information intent, at least one response corresponding to the to-be-processed information; and
a first processing module, configured to send the at least one response to a send terminal corresponding to the customer identity information.

Clause 23. An electronic device, comprising: a memory and a processor, wherein the memory is configured to store one or more computer instructions, and the one or more computer instructions, when executed by the processor, execute the information processing method for a real-time video application according to any one of clauses 1-18.

Clause 24. An information processing apparatus for interactive information during live streaming, the apparatus comprising:
a second receiving module, configured to receive to-be-processed information by means of an interactive interface of a live streaming application, the to-be-processed information comprising a target object and an information intent;
a second sending module, configured to send the to-be-processed information to a remote service platform corresponding to the live streaming application;
a second acquisition module, configured to acquire at least one response corresponding to the to-be-processed information, wherein the at least one response is related to the target object and the information intent comprised in the to-be-processed information; and
a second processing module, configured to display the at least one response in a preset region of the interactive interface of the live streaming application.

Clause 25. An electronic device, comprising: a memory and a processor, wherein the memory is configured to store one or more computer instructions, and the one or more computer instructions, when executed by the processor, execute the information processing method for interactive information during live streaming according to any one of clauses 19-21.

What is claimed is:

1. A method comprising:
acquiring to-be-processed information, the to-be-processed information including at least one of following including customer identity information and real-time video identification information;
identifying a target object and an information intent corresponding to the to-be-processed information;
determining, according to the target object and the information intent, at least one response corresponding to the to-be-processed information, the determining the at least one response corresponding to the to-be-processed information including:
acquiring historical data corresponding to the target object; and
determining, from the historical data, the at least one response matching the information intent, the determining the at least one response matching the information intent including:
acquiring an information label corresponding to the historical data and an intent label corresponding to the information intent;
determining, on a basis of the information label and the intent label, a matching level between the historical data and the information intent; and
determining, on a basis of the matching level between the historical data and the information intent, the at least one response matching the information intent, the determining the at least one response matching the information intent including:
sorting, in a descending order, pieces of the historical data according to matching levels between the historical data and the information intent to obtain first sorted information of the pieces of the historical data;
acquiring a first number configured to limit a number of the at least one response; and
determining the first number of leading pieces of the historical data in the first sorted information to be the at least one response matching the information intent; and
sending the at least one response to a send terminal corresponding to the customer identity information.

2. The method of claim 1, wherein the to-be-processed information corresponds to a real-time video application.

3. The method according to claim 1, wherein the identifying the target object and the information intent corresponding to the to-be-processed information comprises:
acquiring at least one piece of object identifier information included in the to-be-processed information; and
determining, on a basis of the at least one piece of object identifier information, at least one target object corresponding to the to-be-processed information.

4. The method according to claim 3, wherein the object identifier information comprises at least one of following including object name information and object number information.

5. The method according to claim 3, wherein the determining, on the basis of the at least one piece of object identifier information, the at least one target object corresponding to the to-be-processed information comprises:
identifying, on the basis of the at least one piece of object identifier information, at least one information object corresponding to the to-be-processed information;
acquiring a current information object related to currently broadcast content of a real-time video application; and
in response to determining that the at least one information object comprises the current information object, determining the current information object as the target object corresponding to the to-be-processed information.

6. The method according to claim 3, wherein the determining, on the basis of the at least one piece of object identifier information, the at least one target object corresponding to the to-be-processed information comprises:
identifying, on the basis of the at least one piece of object identifier information, at least one information object corresponding to the to-be-processed information;
acquiring a current information object related to currently broadcast content of a real-time video application; and
in response to determining that the at least one information object does not comprise the current information object, determining the at least one information object to be the target object corresponding to the to-be-processed information.

7. The method according to claim 3, further comprising:
in response to determining that the object identifier information included in the to-be-processed information cannot be identified, acquiring a current information object related to currently broadcast content of a real-time video application; and
determining the current information object as the target object corresponding to the to-be-processed information.

8. The method according to claim 7, wherein the acquiring the current information object related to the currently broadcast content of the real-time video application comprises:
acquiring current speech information currently being broadcast by a real-time video application;
determining text information corresponding to the current speech information; and
analyzing and identifying the text information to acquire the current information object related to the currently broadcast content of the real-time video application.

9. The method according to claim 1, wherein the identifying the target object and the information intent corresponding to the to-be-processed information comprises:
analyzing and identifying, by using a machine learning model, the to-be-processed information to obtain at least one information intent corresponding to the to-be-processed information, wherein the machine learning model is trained to determine an information intent of the to-be-processed information.

10. The method according to claim 1, wherein the at least one response comprises at least one of following including a review keyword, a transaction quantity, a valid review, application status information, and an intent response, wherein the valid review comprises at least one of following: pre-transaction data and post-transaction data.

11. The method according to claim 1, wherein after the determining the at least one response corresponding to the to-be-processed information, the method further comprises:
   acquiring first profile information corresponding to the to-be-processed information and at least one piece of second profile information corresponding to the at least one response;
   determining, from the at least one piece of second profile information, target profile information corresponding to the first profile information; and
   determining a response corresponding to the target profile information to be the response corresponding to the to-be-processed information.

12. The method according to claim 11, wherein the determining, from the at least one piece of second profile information, the target profile information corresponding to the first profile information comprises:
   acquiring a matching level between the first profile information with respect to each of the at least one piece of second profile information; and
   determining, on a basis of the matching level and from the at least one piece of second profile information, the target profile information corresponding to the first profile information.

13. The method according to claim 12, wherein the determining, on the basis of the matching level and from the at least one piece of second profile information, the target profile information corresponding to the first profile information comprises:
   sorting, in a descending order, all pieces of the second profile information according to matching levels between the pieces of the second profile information and the first profile information to obtain second sorted information of all pieces of the second profile information;
   acquiring a second number configured to limit a number of the target profile information; and
   determining the second number of leading pieces of the second profile information in the second sorted information to be the at least one piece of target profile information corresponding to the first profile information.

14. An apparatus comprising:
   one or more processors; and
   one or more memories storing thereon computer-readable instructions that, when executed by the one or more processors, cause the one or more processors to perform acts comprising:
      acquiring to-be-processed information, the to-be-processed information including at least one of following including customer identity information and real-time video identification information;
      identifying a target object and an information intent corresponding to the to-be-processed information;
      determining, according to the target object and the information intent, at least one response corresponding to the to-be-processed information;
      acquiring first profile information corresponding to the to-be-processed information and at least one piece of second profile information corresponding to the at least one response;
      determining, from the at least one piece of second profile information, target profile information corresponding to the first profile information, the determining, the target profile information corresponding to the first profile information including:
         acquiring a matching level between the first profile information with respect to each of the at least one piece of second profile information; and
         determining, on a basis of the matching level and from the at least one piece of second profile information, the target profile information corresponding to the first profile information, the determining the target profile information corresponding to the first profile information including:
            sorting, in a descending order, pieces of the second profile information according to matching levels between the pieces of the second profile information and the first profile information to obtain second sorted information of the pieces of the second profile information;
            acquiring a second number configured to limit a number of the target profile information; and
            determining the second number of leading pieces of the second profile information in the second sorted information to be the at least one piece of target profile information corresponding to the first profile information,
      determining a response corresponding to the target profile information to be a response corresponding to the to-be-processed information; and
      sending the response to a send terminal corresponding to the customer identity information.

15. The apparatus according to claim 14, wherein:
   the response comprises at least one of following including: image information and text information; and
   the sending the at least one response to a client corresponding to the to-be-processed information comprises:
      identifying that the at least one response comprises image information; and
      sending, with a priority, the image information to the client for display.

16. The apparatus according to claim 14, wherein the acts further comprise:
   acquiring feedback information corresponding to the response; and
   optimizing, according to the feedback information, a machine learning model configured to determine the information intent of the to-be-processed information.

17. One or more memories storing thereon computer-readable instructions that, when executed by one or more processors, cause the one or more processors to perform acts comprising:
   acquiring to-be-processed information, the to-be-processed information including at least one of following including customer identity information and real-time video identification information;
   identifying a target object and an information intent corresponding to the to-be-processed information;
   determining, according to the target object and the information intent, at least one response corresponding to the to-be-processed information, the determining the at least one response corresponding to the to-be-processed information including:

acquiring historical data corresponding to the target object; and determining, from the historical data, the at least one response matching the information intent, the determining the at least one response matching the information intent including:

acquiring an information label corresponding to the historical data and an intent label corresponding to the information intent;

determining, on a basis of the information label and the intent label, a matching level between the historical data and the information intent; and determining, on a basis of the matching level between the historical data and the information intent, the at least one response matching the information intent, the determining the at least one response matching the information intent including:

sorting, in a descending order, pieces of the historical data according to matching levels between the historical data and the information intent to obtain first sorted information of the pieces of the historical data;

acquiring a first number configured to limit a number of the at least one response; and determining the first number of leading pieces of the historical data in the first sorted information to be the at least one response matching the information intent; and sending the at least one response to a send terminal corresponding to the customer identity information.

18. The one or more memories according to claim 17, wherein the to-be-processed information corresponds to a real-time video application.

19. The one or more memories according to claim 17, wherein the identifying the target object and the information intent corresponding to the to-be-processed information comprises:

acquiring at least one piece of object identifier information included in the to-be-processed information; and determining, on a basis of the at least one piece of object identifier information, at least one target object corresponding to the to-be-processed information.

20. The one or more memories according to claim 17, wherein the identifying the target object and the information intent corresponding to the to-be-processed information comprises:

analyzing and identifying, by using a machine learning model, the to-be-processed information to obtain at least one information intent corresponding to the to-be-processed information, wherein the machine learning model is trained to determine an information intent of the to-be-processed information.

* * * * *